US012803312B2

(12) United States Patent
Shim et al.

(10) Patent No.: US 12,803,312 B2
(45) Date of Patent: Nov. 17, 2026

(54) ELECTRONIC DEVICE AND METHOD FOR CHARGING THEREOF

(71) Applicant: Samsung Electronics Co., Ltd., Suwon-si (KR)

(72) Inventors: Jaekyu Shim, Suwon-si (KR); Kyungsup Lee, Suwon-si (KR); Bongyeol Lee, Suwon-si (KR); Insun Yang, Suwon-si (KR); Woojong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 719 days.

(21) Appl. No.: 17/876,060

(22) Filed: Jul. 28, 2022

(65) Prior Publication Data

US 2023/0051147 A1 Feb. 16, 2023

Related U.S. Application Data

(63) Continuation of application No. PCT/KR2022/010752, filed on Jul. 22, 2022.

(30) Foreign Application Priority Data

Aug. 11, 2021 (KR) ........................ 10-2021-0106197

(51) Int. Cl.
*H02J 7/82* (2026.01)
*H02J 7/90* (2026.01)

(52) U.S. Cl.
CPC .............. *H02J 7/825* (2026.01); *H02J 7/933* (2026.01); *H02J 7/971* (2026.01)

(58) Field of Classification Search
CPC .. H02J 7/0048; H02J 7/0049; H02J 7/007188; H02J 7/825; H02J 7/933;
(Continued)

(56) References Cited

U.S. PATENT DOCUMENTS 10,468,905 B2 11/2019 Kim et al.
10,666,077 B1 * 5/2020 Dharia .................. H02J 7/0071
(Continued)

FOREIGN PATENT DOCUMENTS

EP 3702885 A1 9/2020
JP 2006-192183 A 7/2006
(Continued)

OTHER PUBLICATIONS

Extended European Search Report dated Nov. 26, 2024, issued in European Application No. 22856057.9-1002.
(Continued)

*Primary Examiner* — Julian D Huffman
*Assistant Examiner* — John P Ondrasik
(74) *Attorney, Agent, or Firm* — Jefferson IP Law, LLP

(57) ABSTRACT

An electronic device is provided. The electronic device includes a charging circuit, a battery, and a processor operatively connected to the charging circuit and the battery, wherein the processor is configured to charge the battery with a first voltage corresponding to a first charging level, identify the number of times that supplementary charging is performed after the electronic device is detected to be in a fully-charged state, when the number of times that the supplementary charging is performed exceeds a specified number of times, configure a charging level for charging the battery to a second charging level configured to be lower than the first voltage of the first charging level, and adjust a voltage received from a power transmission device through the charging circuit to a second voltage corresponding to the second charging level and charge the battery with the adjusted second voltage.

14 Claims, 12 Drawing Sheets

(58) Field of Classification Search
CPC ...... H02J 7/971; H02J 7/00; H02J 7/04; H02J 7/96; G01R 31/382; G01R 19/16542
See application file for complete search history.

(56) References Cited

U.S. PATENT DOCUMENTS

| | | | | |
|---|---|---|---|---|
| 11,196,096 | B2 | 12/2021 | Song et al. | |
| 2002/0060554 | A1 * | 5/2002 | Odaohhara | H02J 7/0071 320/134 |
| 2011/0057603 | A1 * | 3/2011 | Marty | H02J 7/0069 320/155 |
| 2011/0169459 | A1 * | 7/2011 | Chen | H02J 7/0069 320/160 |
| 2012/0112700 | A1 | 5/2012 | Morimoto et al. | |
| 2012/0159220 | A1 | 6/2012 | Winkler et al. | |
| 2016/0064960 | A1 * | 3/2016 | DiCarlo | H02J 7/007 320/134 |
| 2020/0280205 | A1 * | 9/2020 | Kim | H02J 7/0071 |
| 2021/0111577 | A1 | 4/2021 | Kang et al. | |
| 2021/0126483 | A1 | 4/2021 | Fan et al. | |
| 2021/0194265 | A1 * | 6/2021 | Kwak | H02J 7/005 |

FOREIGN PATENT DOCUMENTS

| | | | | |
|---|---|---|---|---|
| JP | 2007-195367 | A | 8/2007 | |
| JP | 2019-050647 | A | 3/2019 | |
| KR | 10-2017-0123093 | A | 11/2017 | |
| KR | 10-2018-0024786 | A | 3/2018 | |
| KR | 10-2021-0043351 | A | 4/2021 | |
| KR | 10-2021-0078224 | A | 6/2021 | |
| WO | 2014/098875 | A1 | 6/2014 | |
| WO | WO-2018120236 | A1 * | 7/2018 | H01M 10/44 |
| WO | WO-2022218046 | A1 * | 10/2022 | H02J 7/96 |

OTHER PUBLICATIONS

International Search Report dated Nov. 2, 2022, issued in International Patent Application No. PCT /KR2022/010752.
Korean Office Action dated Feb. 4, 2026, issued in Korean Application No. 10-2021-0106197.

* cited by examiner

ELECTRONIC DEVICE AND METHOD FOR CHARGING THEREOF

CROSS-REFERENCE TO RELATED APPLICATION(S)

This application is a continuation application, claiming priority under § 365(c), of an International application No. PCT/KR2022/010752, filed on Jul. 22, 2022, which is based on and claims the benefit of a Korean patent application number 10-2021-0106197, filed on Aug. 11, 2021, in the Korean Intellectual Property Office, the disclosure of which is incorporated by reference herein in its entirety.

TECHNICAL FIELD

The disclosure relates to an electronic device and a charging method using the same.

BACKGROUND ART

An electronic device may include a battery to supply power necessary to perform various functions. The electronic device may receive power from a power transmitting device in wired or wireless manner, thereby charging the battery.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

When an electronic device is used by a user while being connected to a power transmitting device, the battery may be overcharged, thereby resulting in swelling. In order to prevent the occurrence of swelling, the electronic device may be controlled to be charged up to a predetermined level (for example, about 80-85% level) of the entire battery capacity. However, charging the battery up to a predetermined level of the entire capacity may shorten the electronic device use time.

Aspects of the disclosure are to address at least the above-mentioned problems and/or disadvantages and to provide at least the advantages described below. Accordingly, an aspect of the disclosure is to provide an electronic device for gradually lowering voltage values for charging and/or supplementary charging, based on the number of times supplementary charging is performed after the battery is fully charged and/or the time of connection to a power transmitting device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a charging circuit, a battery, and a processor operatively connected to the charging circuit and the battery, wherein the processor is configured to charge the battery with a first voltage corresponding to a first charging level, identify a number of times that supplementary charging is performed, after the electronic device is detected to be in a fully-charged state, when the number of times that the supplementary charging is performed exceeds a specified number of times, configure a charging level for charging the battery to a second charging level configured to be lower than the first voltage of the first charging level, and adjust a voltage received from a power transmission device through the charging circuit to a second voltage corresponding to the second charging level and charge the battery with the adjusted second voltage.

In accordance with another aspect of the disclosure, a charging method of an electronic device is provided. The charging method includes charging a battery with a first voltage corresponding to a first charging level, identifying a number of times that supplementary charging is performed, after the electronic device is detected to be in a fully-charged state, when the number of times that the supplementary charging is performed exceeds a specified number of times, configuring a charging level for charging the battery to a second charging level configured to be lower than the first voltage of the first charging level, and adjusting a voltage received from a power transmission device through a charging circuit to a second voltage corresponding to the second charging level and charging the battery with the adjusted second voltage.

Advantageous Effects of Invention

An electronic device according to various embodiments of the disclosure may gradually lower voltage values for charging and/or supplementary charging, based on the number of times supplementary charging is performed after the battery is fully charged and/or the time of connection to a power transmitting device, such that not only can swelling of the battery of electronic device be prevented, but also the electronic device use time can be secured.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
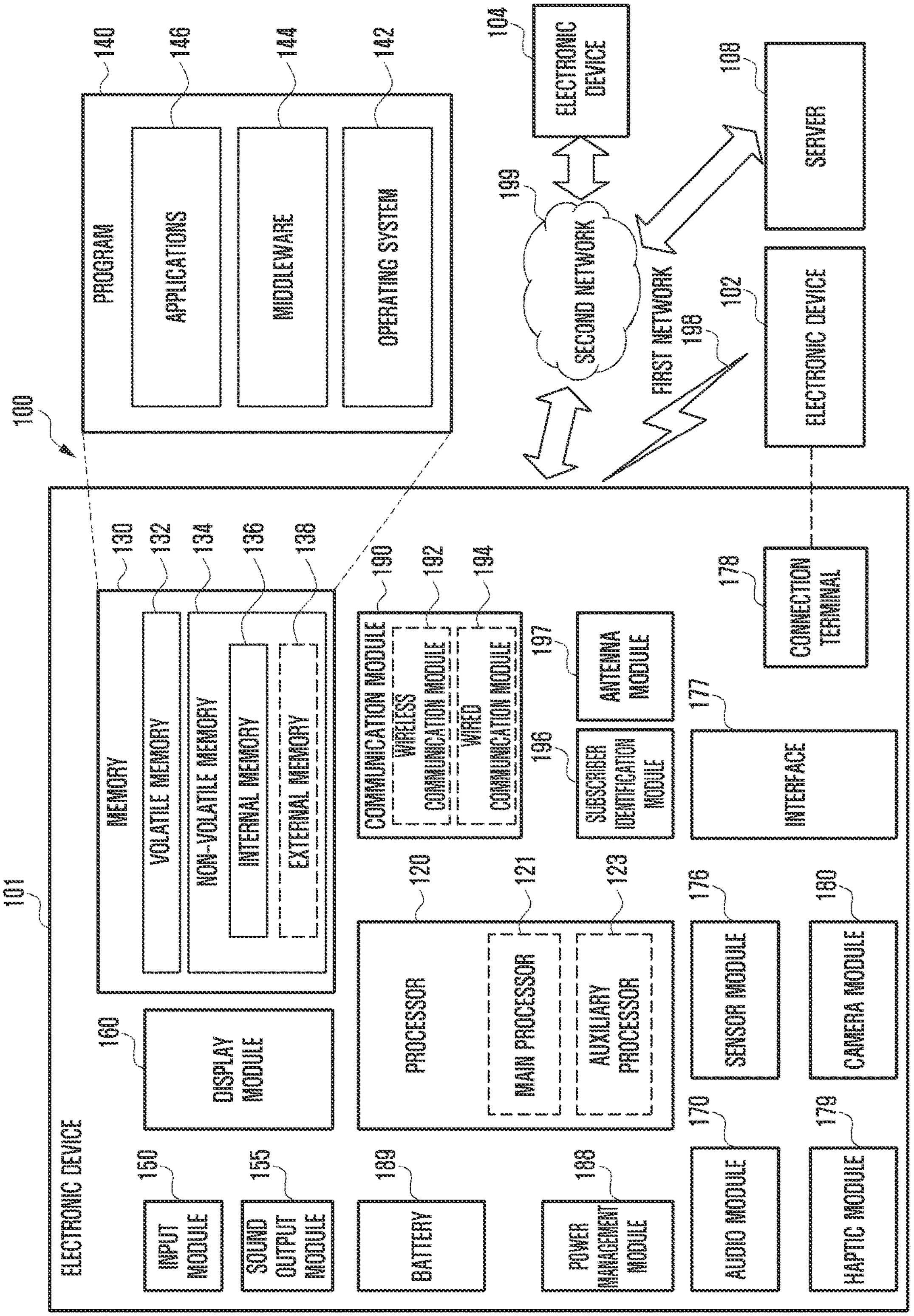
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry.” A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
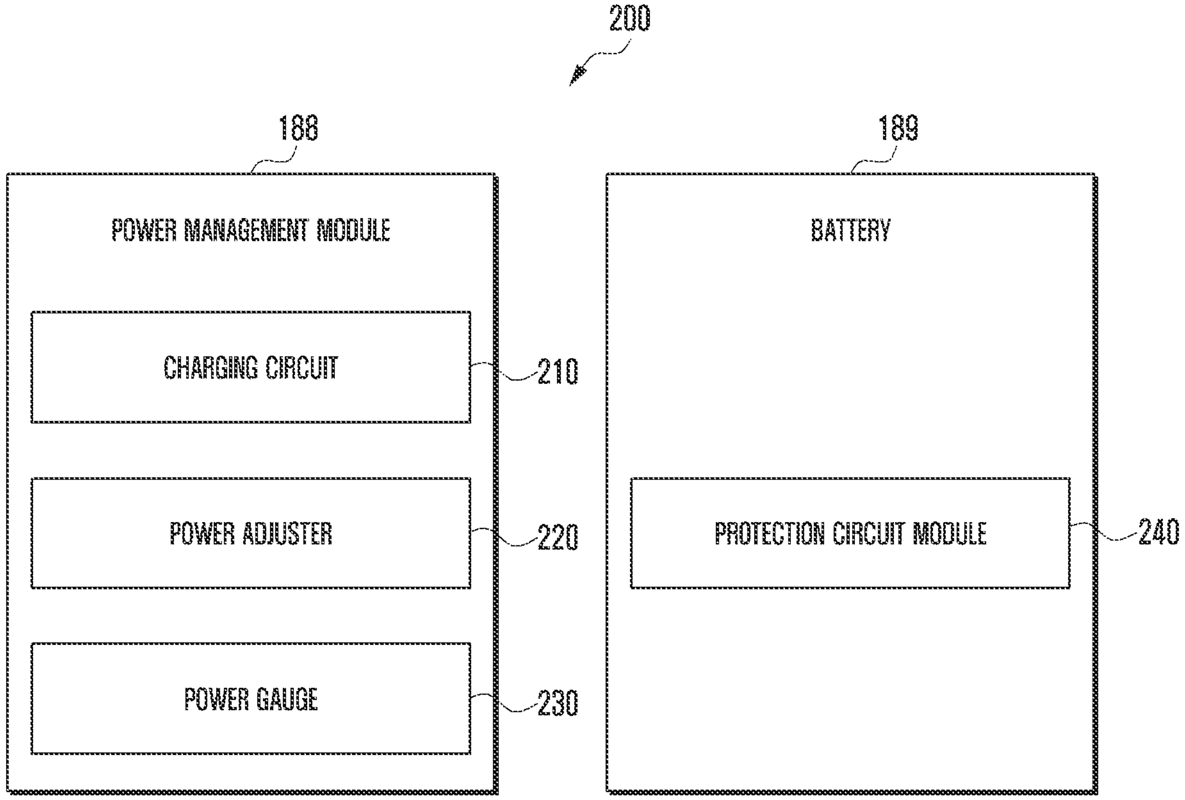
FIG. 2 is a block diagram of a power management module and a battery, according to an embodiment of the disclosure.

FIG. 2 is a block diagram illustrating the power management module and the battery according to an embodiment of the disclosure.

Referring to FIG. 2, in a black diagram 200, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connection terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188.

According to an embodiment, the corresponding sensor (e.g., a temperature sensor) of the sensor module 176 may be included as part of the PCM 240, or may be disposed near the battery 189 as a separate device.

Figure 3:
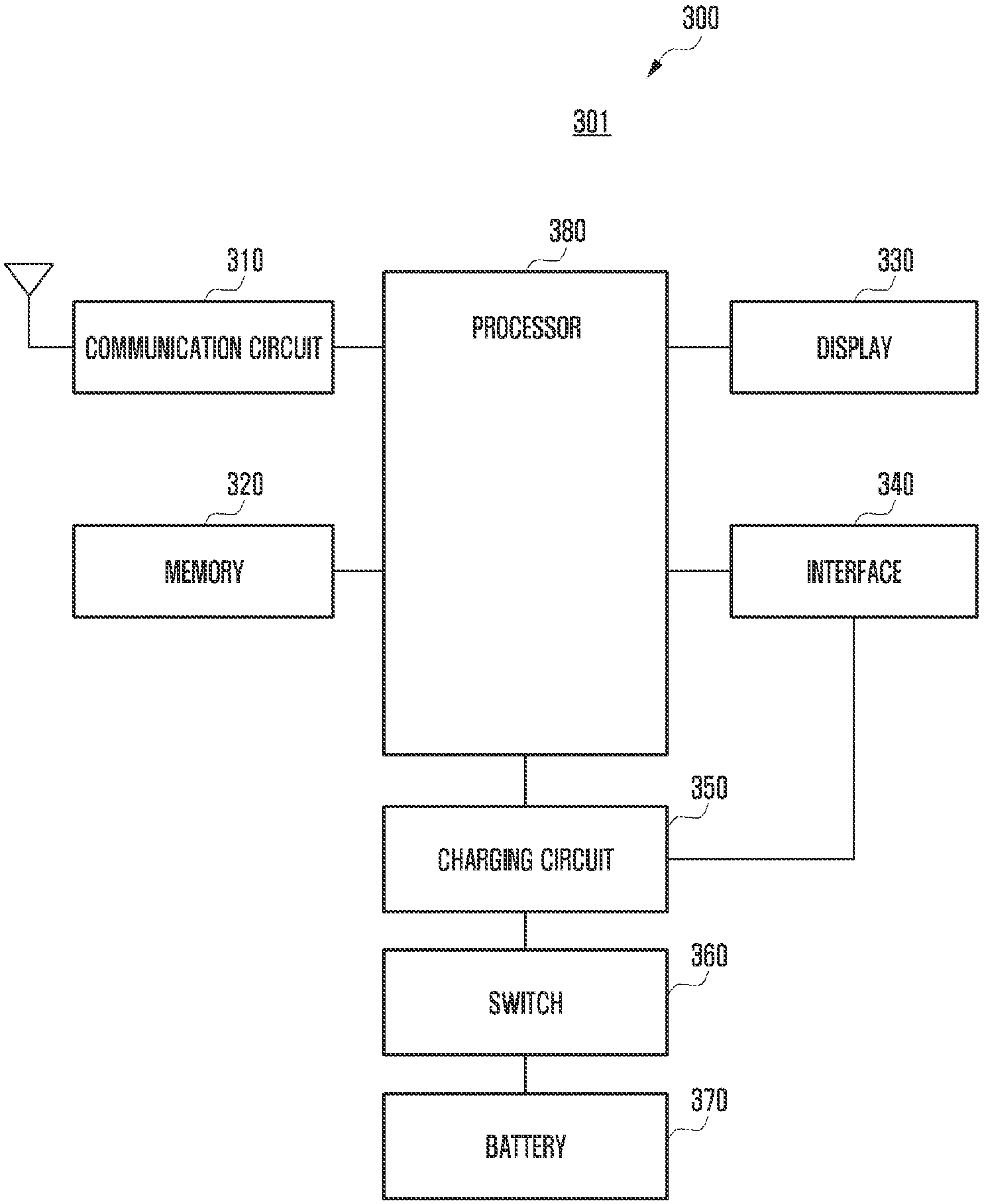
FIG. 3 is a block diagram illustrating an electronic device according to an embodiment of the disclosure.

FIG. 3 is a block diagram illustrating an electronic device 301 according to an embodiment of the disclosure.

Referring to FIG. 3, a block diagram 300, the electronic device 301 (e.g., the electronic device 101 of FIG. 1) may include a communication circuit 310 (e.g., the communication module 190 of FIG. 1), a memory 320 (e.g., the memory 130 of FIG. 1), a display 330 (e.g., the display module 160 of FIG. 1), an interface 340, a charging circuit 350 (e.g., the charging circuitry 210 of FIG. 2), a switch unit 360, a battery 370 (e.g., the battery 189 of FIG. 1), and/or a processor 380 (e.g., the processor 120 of FIG. 1).

In various embodiments, the communication circuit 310 (e.g., the communication module 190 of FIG. 1) may control a communication connection between the electronic device 201 and at least one external electronic device (e.g., the electronic device 102 and the electronic device 104 of FIG. 1) and/or a server (e.g., the server 108 of FIG. 1) under the control of the processor 380.

In various embodiments, the memory 320 (e.g., the memory 130 of FIG. 1) may perform a function of storing a program (e.g., the program 140 of FIG. 1) for processing and controlling the processor 380, an operating system (OS) (e.g., the operating system 142 of FIG. 1), various applications, and/or input/output data, and store a program for controlling the overall operation of the electronic device 301. The memory 320 may store various configuration information required when the electronic device 301 processes functions related to various embodiments of the disclosure.

In an embodiment, the memory 320 may store a program for adjusting a charging level for charging the battery 370, based on information related to the battery 370. The memory 320 may store information on multiple charging levels in which charging voltages (e.g., a full charging voltage and a supplementary charging voltage) of the battery 370 are configured differently. The memory 320 may store a reference value (e.g., a specified voltage, a specified level, and a specified time) for adjusting a charging level for charging the battery 370 configured differently in each of the multiple charging levels. The memory 320 may store a score mapped to information related to the battery 370 in order to obtain a score, based on the information related to the battery 370. The memory 320 may store a reference value for adjusting a charging level of the battery 370, by comparing the same with the score obtained based on the information related to the battery 370.

In various embodiments, the display 330 (e.g., the display module 160 of FIG. 1) may display an image under the control of the processor 380, and may be implemented as one of a liquid crystal display (LCD), a light-emitting diode (LED) display, an organic light-emitting diode (OLED) display, or a micro electro mechanical systems (MEMS) display, an electronic paper display, or a flexible display. However, the disclosure is not limited thereto.

In an embodiment, the display 330 may display a connected power transmission device under the control of the processor 380, and display various information related to power reception of the electronic device 301 and/or charging of the battery 370 through a user interface. For example, the user interface may include a user interface for charging state information (e.g., state information on whether power is being received from the connected power transmission device and/or state information (e.g., remaining amount information of the battery 370) of the battery 370) of the electronic device 301.

In various embodiments, the interface 340 may include a wired interface (e.g., the connection terminal 178 of FIG. 1) and a wireless interface (not shown). The wired interface and the wireless interface may be mounted on a part of a housing (not shown) of the electronic device 301. The electronic device 301 may be connectable to a power transmission device through each of the wired interface and the wireless interface.

In an embodiment, the wired interface may include a universal serial bus (USB) connector (not shown), and may be connectable to the power transmission device by wire through the USB connector. In an embodiment, the wired interface may be an interface for USB charging and/or on the go (OTG) power supply. In an embodiment, an external power source (a travel adapter (TA) or a battery pack) may be connected to the wired interface.

In an embodiment, the wireless interface may include a coil (not shown) (also referred to as a "conductive pattern") and a transmit/receive integrated chip (TRX IC) (not shown), and wirelessly transmit or receive power to or from the power transmission device through the conductive pattern and the TRX IC. Wireless power may be transmitted or received by using a wireless power transmission scheme of a magnetic field inductive coupling scheme, a resonance coupling scheme, or a mixture thereof.

In an embodiment, the power transmission device may be, as a device connectable in a wired manner, a device which supplies power in a wired manner The power transmission device which supplies power in a wired manner may be connected by wire, like a TA, to supply power to the electronic device 301.

In an embodiment, the power transmission device connected to the electronic device 301 through the wired interface may include a wired high voltage (HV) device (e.g., a device which supports adaptive fast charge (AFC) and quick charge (QC)).

The disclosure is not limited thereto, and the power transmission device may be a device which wirelessly supplies power. For example, the device which wirelessly supplies power may be a device which wirelessly supplies power to the electronic device 301 by using a conductive pattern, such as a wireless charging pad. In an embodiment, the power transmission device connected to the electronic device 301 through the wireless interface may include a wireless high voltage (HV) device (e.g., a device which supports adaptive fast charge (AFC) and quick charge (QC)). In an embodiment, the wireless HV device may include a wireless charging pad which supports fast charging. The wireless charging pad may communicate with the TRX IC through in-band communication to determine whether to perform fast charging, or determine whether to perform fast charging by using a separate communication module (e.g., Bluetooth or ZigBee).

In an embodiment, the charging circuit 350 (e.g., the charging circuitry 210 of FIG. 2) may be electrically connected to the battery 370, and configured to electrically connect the interface 340 (e.g., a wired interface and a wireless interface) and the battery 370.

In an embodiment, the charging circuit 350 may include an interface controller (not shown). The interface controller (not shown) may identify the type of a power transmission device connected to the interface 340, and determine whether fast charging is supported through adaptive fast charge (AFC) communication with the power transmission device. In an embodiment, the interface controller (not shown) may include a micro USB interface IC (MUIC) or a fast charging (e.g., adaptive fast charge (AFC) and quick charge (QC)) interface. The MUIC may identify whether the power transmission device connected to the interface 340 is a wired charging device or a wireless charging device. A fast charging interface may identify whether fast charging is supported, through communication with the power transmission device. In a case where fast charging is supported, the power transmission device may increase transmission/reception power.

In an embodiment, the charging circuit 350 may convert power input from the power transmission device through the interface 340 (e.g., the wired interface and the wireless interface) into a charging voltage and a charging current suitable for charging the battery 370.

In an embodiment, when the power transmission device is connected by wire through the interface 340, the charging circuit 350 may control the battery 370 to be charged, by using power received from the power transmission device connected by wire.

In an embodiment, when the power transmission device is wirelessly connected, the charging circuit 350 may control the battery 370 to be charged, by receiving power from the power transmission device wirelessly connected.

In an embodiment, the charging circuit 350 may boost (↑) or buck (↓) a charging voltage provided to provide a constant charging current to the battery 370.

In various embodiments, the battery 370 (e.g., the battery 189 of FIG. 1) may be mounted in a housing (not shown) of the electronic device 301 and may be chargeable. The battery 370 may include, for example, a lithium-ion battery, a rechargeable battery, and/or a solar battery.

In various embodiments, the switch unit 360 may control a connection between the charging circuit 350 and the battery 370. When it is detected that the battery 370 is in a fully-charged state, the switch unit 360 may become an off state under the control of the processor 380. As the switch unit 360 becomes the off state, power received from the power transmission device through the charging circuit 350 may not be transmitted to the battery 370. After it is detected that the battery 370 is in a fully-charged state, when a voltage of the battery 370 becomes less than or equal to a specified voltage, the switch unit 360 may become an on state under the control of the processor 380. As the switch unit 360 becomes the on state, the battery 370 may be supplementally charged using power received from the power transmission device through the charging circuit 350.

In various embodiments, the processor 380 (e.g., the processor 120 of FIG. 1) may include, for example, a micro controller unit (MCU), and control multiple hardware components connected to the processor 380 by driving an operating system (OS) or an embedded software program. For example, the processor 380 may control multiple hardware components according to instructions (e.g., the program 140 of FIG. 1) stored in the memory 320.

In an embodiment, the processor 380 may charge the battery 370 with a first voltage corresponding to a first charging level. The electronic device 301 may be connected to the power transmission device by wire or wirelessly through the interface 340, for example, the wired interface or the wireless interface. The electronic device 301 may charge the battery 370 by receiving power from the power transmission device connected by wire or wirelessly through the wired interface or the wireless interface. The electronic device 301 may identify information related to the battery 370. For example, the information related to the battery 370 may include the number of times that supplementary charging is performed after the electronic device 301 is detected to be in a fully-charged state, a time in which the electronic device 301 is connected to the power transmission device after being detected to be in a fully-charged state, a voltage of the battery 370 after detachment of the power transmission device is detected, the capacity (e.g., the remaining capacity of the battery 370, a state of charge (SOC), or a level of the battery 370) of the battery 370 after detachment of the power transmission device is detected, the amount of discharge of the battery 370 after detachment of the power transmission device is detected, the capacity of the battery 370 identified by charging of the battery 370 performed according to reconnection with the power transmission device after detachment of the power transmission is detected, and/or an elapsed time after detachment of the power transmission device is detected.

In an embodiment, the processor 380 may adjust a charging level for charging the battery 370 to a second charging level different from the first voltage of the first charging level, based on the information related to the battery 370. For example, if it is identified that the number of times of supplementary charging performed after the battery 370 is detected to be in a fully-charged state exceeds a specified number of times, and/or a time in which the electronic device 301 is connected to the power transmission device after the battery 370 is detected to be in a fully-charged state exceeds a specified time, the processor 380 may adjust, based on the information related to the battery 370, the charging level for charging the battery 370 to the second charging level different from the first voltage of the first charging level. In another example, if it is identified that a voltage of the battery 370 after detachment of the power transmission device is detected is less than or equal to a specified voltage, the capacity of the battery 370 is less than or equal to a specified level, and/or an elapsed time after detachment of the power transmission device is detected exceeds a specified time, the processor 380 may adjust, based on the information related to the battery 370, the charging level for charging the battery 370 to the second charging level different from the first voltage of the first charging level.

In an embodiment, the electronic device 301 may adjust a voltage received through the charging circuit 350 to a second voltage corresponding to the second charging level, and charge the battery 370 with the adjusted second voltage.

The electronic device 301 according to various embodiments may include the charging circuit 350, the battery 370, and the processor 380 operatively connected to the charging circuit 350 and the battery 370, and the processor 380 is configured to charge the battery 370 with a first voltage corresponding to a first charging level, identify the number of times that supplementary charging is performed after the electronic device 301 is detected to be in a fully-charged state, when the number of times that the supplementary charging is performed exceeds a specified number of times, configure a charging level for charging the battery 370 to a second charging level configured to be lower than the first voltage of the first charging level, and adjust a voltage received from the power transmission device through the charging circuit 350 to a second voltage corresponding to the second charging level and charge the battery 370 with the adjusted second voltage.

In various embodiments, the processor 380 may identify, when the number of times that the supplementary charging is performed exceeds the specified number of times, a time of being connected to the power transmission device, and when the time of being connected to the power transmission device exceeds a specified time, configure the charging level for charging the battery 370 to the second charging level configured to be lower than the first voltage of the first charging level.

In various embodiments, the processor 380 may be configured to, after configuring the charging level for charging the battery 370 to the second charging level, reset the number of times that the supplementary charging is performed and the time of being connected to the power transmission device, and reconfigure the specified number of times and the specified time to a specified number of times and a specified time which correspond to the second charging level.

In various embodiments, the processor 380 may obtain a first score, based on the identified number of times that the supplementary charging is performed, obtain a second score, based on the identified time of being connected to the power transmission device, and when the sum of the first score and the second score exceeds a specified value, configure the charging level for charging the battery 370 to the second charging level configured to be lower than the first voltage of the first charging level.

In various embodiments, the processor 380 may be configured to, after detachment of the power transmission device is detected, identify whether reconnection with the power transmission device is made, when the reconnection with the power transmission device is identified, identify the amount of discharge of the battery 370, when the amount of discharge of the battery 370 is less than a specified level, configure the charging level for charging the battery 370 to the first charging level configured to be higher than the second voltage of the second charging level, and when the reconnection with the power transmission device is identified, adjust the voltage received from the power transmission device through the charging circuit 350 to a first voltage corresponding to the first charging level, and charge the battery 370 with the adjusted first voltage.

In various embodiments, the processor 380 may measure, when the amount of discharge of the battery 370 is less than the specified level, an elapsed time after detachment of the power transmission device is detected, and, based on the measured elapsed time exceeding a specified time, configure the charging level for charging the battery 370 to the first charging level configured to be higher than the second voltage of the second charging level.

In various embodiments, the processor 380 may obtain a first score, based on the amount of discharge of the battery 370, obtain a second score, based on the measured elapsed time after the detachment of the power transmission device is detected, and when the sum of the first score and the second score exceeds a specified value, configure the charging level for charging the battery 370 to the first charging level configured to be higher than the second voltage of the second charging level.

In various embodiments, the processor 380 may identify the amount of charge of the battery 370 while charging the battery 370 with the adjusted first voltage, and when the amount of charge of the battery 370 exceeds a second specified level, configure the charging level for charging the battery 370 to the second charging level configured to be lower than the first voltage of the first charging level.

The electronic device 301 according to various embodiments may further include the memory 320, and the processor 380 may be configured to accumulate the identified amount of discharge of the battery 370 and store the accumulated amount of discharge in the memory 320.

In various embodiments, the processor 380 may be configured to, if detachment of the power transmission device is detected, measure an elapsed time after the detachment of the power transmission device is detected, configure the charging level for charging the battery 370 to the first charging level configured to be higher than the second voltage of the second charging level, based on the measured elapsed time exceeding a specified time, and when reconnection with the power transmission device is identified, adjust the voltage received from the power transmission device through the charging circuit 350 to a first voltage corresponding to the first charging level, and charge the battery 370 with the adjusted first voltage.

Figure 4:
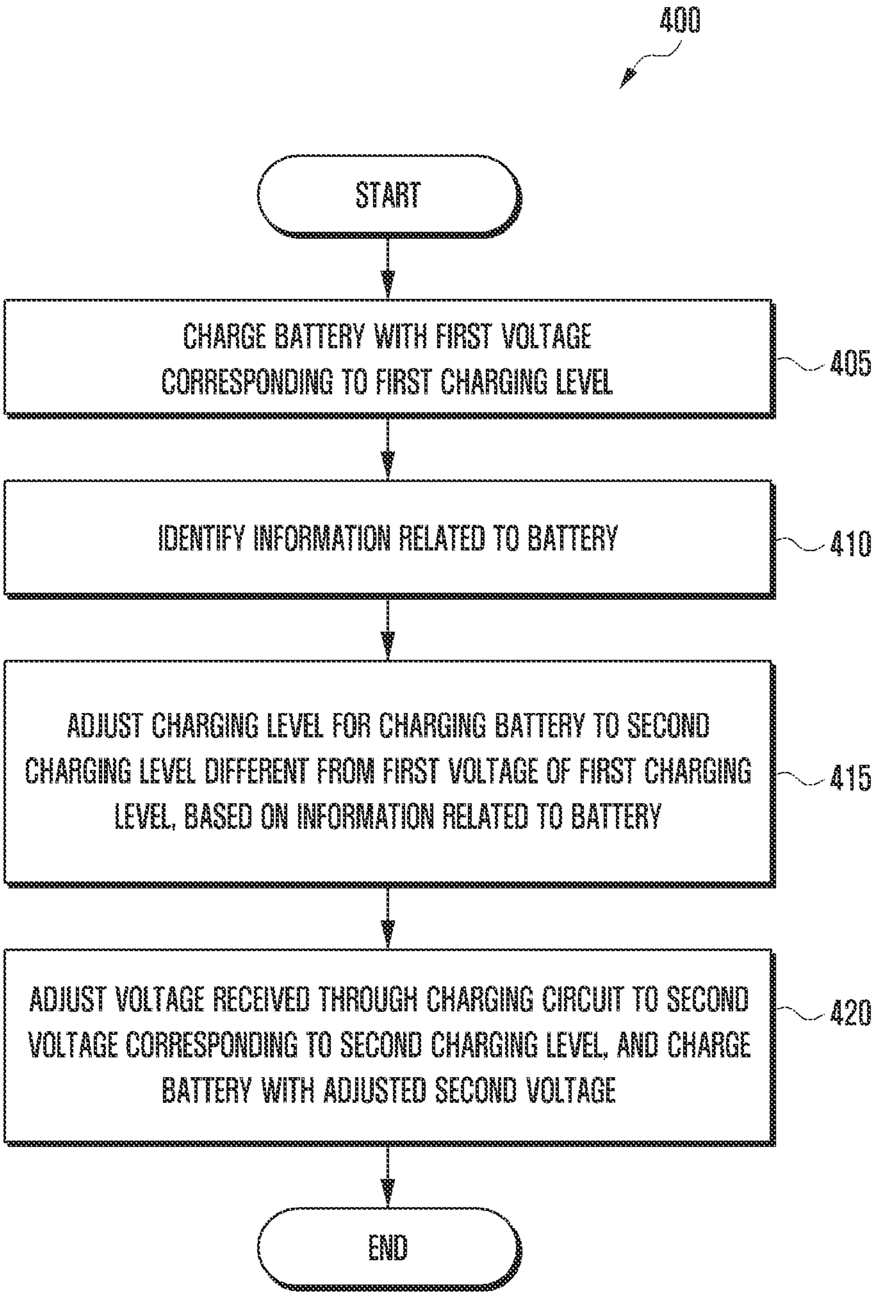
FIG. 4 is a flowchart illustrating a method for adjusting a charging level, based on information related to a battery of an electronic device, according to an embodiment of the disclosure.

FIG. 4 is a flowchart illustrating a method for adjusting a charging level, based on information related to a battery of an electronic device, according to an embodiment of the disclosure.

Referring to FIG. 4, in a method 400, in operation 405, an electronic device (e.g., the electronic device 301 of FIG. 3) may charge a battery (e.g., the battery 370 of FIG. 3) with a first voltage corresponding to a first charging level.

In an embodiment, the electronic device 301 may be connected to a power transmission device by wire or wirelessly through an interface (e.g., the interface 340 of FIG. 3), for example, a wired interface or a wireless interface. The electronic device 301 may charge the battery 370 by receiving power from the power transmission device connected by wire or wirelessly through the wired interface or the wireless interface. For example, the electronic device 301 may convert power input from the power transmission device through a charging circuit (e.g., the charging circuit 350 of FIG. 3) into a charging voltage and a charging current suitable for charging the battery 370. The electronic device 301 may charge the battery 370 by using the converted charging voltage and charging current.

In various embodiments, as shown in Table 1 below, information (or information on a range of multiple charging levels) on multiple charging levels (e.g., a first level, a second level, a third level, a fourth level, and a fifth level) related to a charging voltage of the battery 370 may be pre-stored in a memory (e.g., the memory 320 of FIG. 3). For example, in each of the multiple charging levels (e.g., the first level, the second level, the third level, the fourth level, and the fifth level) related to the charging voltage of the battery 370, a voltage (or a range of a voltage for charging the battery 370) for charging the battery 370, for example, a voltage (e.g., a full charging voltage) for full charging and a voltage (e.g., a supplementary charging voltage) for supplementary charging may be configured differently.

TABLE 1

| | First level | Second level | Third level | Fourth level | Fifth level |
|---|---|---|---|---|---|
| Full charging voltage | 4.38 V | 4.36 V~ 4.37 V | 4.34 V~ 4.33 V | 4.32 V~ 4.28 V | 4.27 V |
| Supplementary charging voltage | 4.31 V | 4.29 V~ 4.30 V | 4.27 V~ 4.26 V | 4.25 V~ 4.21 V | 4.2 V |

In Table 1 according to various embodiments, the multiple charging levels has been described to include five levels (e.g., a first level, a second level, a third level, a fourth level, and a fifth level), but is not limited thereto. For example, the multiple charging levels may include less than five levels or more than five levels in which a voltage (or a range of a voltage for charging the battery 370) (e.g., a full charging voltage and a supplementary charging voltage) for charging the battery 370 is configured differently.

The first voltage corresponding to the first charging level in operation 405 according to various embodiments may be a voltage corresponding to one level among the multiple charging levels according to Table 1 described above.

In an embodiment, the electronic device 301 may identify information related to the battery 370 in operation 410. For example, the information related to the battery 370 may include the number of times that supplementary charging is performed after the electronic device 301 is detected to be in a fully-charged state, a time in which the electronic device 301 is connected to the power transmission device after being detected to be in a fully-charged state, a voltage of the battery 370 after detachment of the power transmission device is detected, the capacity (e.g., the remaining capacity of the battery 370, a state of charge (SOC), or a level of the battery 370) of the battery 370 after detachment of the power transmission device is detected, the amount of discharge of the battery 370 after detachment of the power transmission device is detected, the capacity of the battery 370 identified by charging of the battery 370 performed according to reconnection with the power transmission device after detachment of the power transmission is detected, and/or an elapsed time after detachment of the power transmission device is detected.

In an embodiment, in operation 415, the electronic device 301 may adjust a charging level for charging the battery 370 to a second charging level different from the first voltage of the first charging level, based on the information related to the battery 370. For example, the electronic device 301 may identify the information related to the battery 370 and adjust the charging level for charging the battery 370, based on the multiple charging levels according to Table 1 described above.

In various embodiments, as the charging level according to the above-described Table 1 becomes higher, for example, as the charging level is adjusted from the first level to the fifth level, a full charging voltage and a supplementary charging voltage may be lowered. In an embodiment, the electronic device 301 may reduce, based on the information related to the battery 370, the amount of charge of the battery 370 by stepwise lowering a voltage for charging the battery 370 (e.g., stepwise adjustment from the first level to the fifth level). For example, if it is identified that the number of times of supplementary charging performed after the electronic device is detected to be in a fully-charged state exceeds a specified number of times, and/or a time in which the electronic device 301 is connected to the power transmission device after being detected to be in a fully-charged state exceeds a specified time, the electronic device 301 may stepwise adjust the charging level for charging the battery 370 (e.g., stepwise configure the charging level higher from the first level to the fifth level). The electronic device 301 may stepwise lower a voltage for charging the battery 370 and thus reduce the amount of charge of the battery 370, so as to prevent swelling of the battery 370 due to overcharging.

In various embodiments, a reference value (e.g., a specified number of times and a specified time) for increasing the charging level for charging the battery 370 according to Table 1 described above may be configured differently for each level. For example, each of a reference value adjusted from the first level to the second level, a reference value adjusted from the second level to the third level, a reference value adjusted from the third level to the fourth level, and a reference value adjusted from the fourth level to the fifth level may be configured differently.

In various embodiments, as the charging level according to the above-described Table 1 becomes lower, for example, as the charging level is adjusted from the fifth level to the first level, a full charging voltage and a supplementary charging voltage may be increased. In an embodiment, the electronic device 301 may increase, based on the information related to the battery 370, the amount of charge of the battery 370 by stepwise increasing a voltage for charging the battery 370 (e.g., stepwise adjustment from the fifth level to the first level). For example, if it is identified that a voltage of the battery 370 after detachment of the power transmission device is detected is less than or equal to a specified voltage, or the capacity of the battery 370 is less than or equal to a specified level, and/or an elapsed time after detachment of the power transmission device is detected exceeds a specified time, the electronic device 301 may stepwise adjust a level for charging the battery 370 (e.g., configure the level from the fifth level to the first level to be lower in steps). The electronic device 301 may increase the amount of charge of the battery 370 by stepwise increasing the voltage for charging the battery 370 in a situation in which heat of the battery 370 does not occur.

In various embodiments, a reference value (e.g., a specified voltage, a specified level, and a specified time) for lowering the charging level for charging the battery 370 according to Table 1 described above may be configured differently for each level. For example, each of a reference value adjusted from the fifth level to the fourth level, a reference value adjusted from the fourth level to the third level, a reference value adjusted from the third level to the second level, and a reference value adjusted from the second level to the first level may be configured differently.

In an embodiment, in operation 420, the electronic device 301 may adjust a voltage received through the charging circuit 350 to a second voltage corresponding to the second charging level, and charge the battery 370 with the adjusted second voltage.

In various embodiments, a battery protection function of adjusting (e.g., reducing a charging current or voltage, or stopping charging) the charging of the battery 370 according to whether the battery 370 is normal or abnormal, which is identified based on charging state information (e.g., life span, overvoltage, low voltage, overcurrent, overcharge, over discharge, overheat, short-circuiting, or swelling) related to the charging of the battery 370 may be configured. In this case, the electronic device 301 may adjust the charging level for charging the battery 370 to a level of a lower voltage among a voltage corresponding to a level configured based on the information related to the battery 370 identified in operation 410 and a voltage configured in the battery protection function.

Figure 5A:
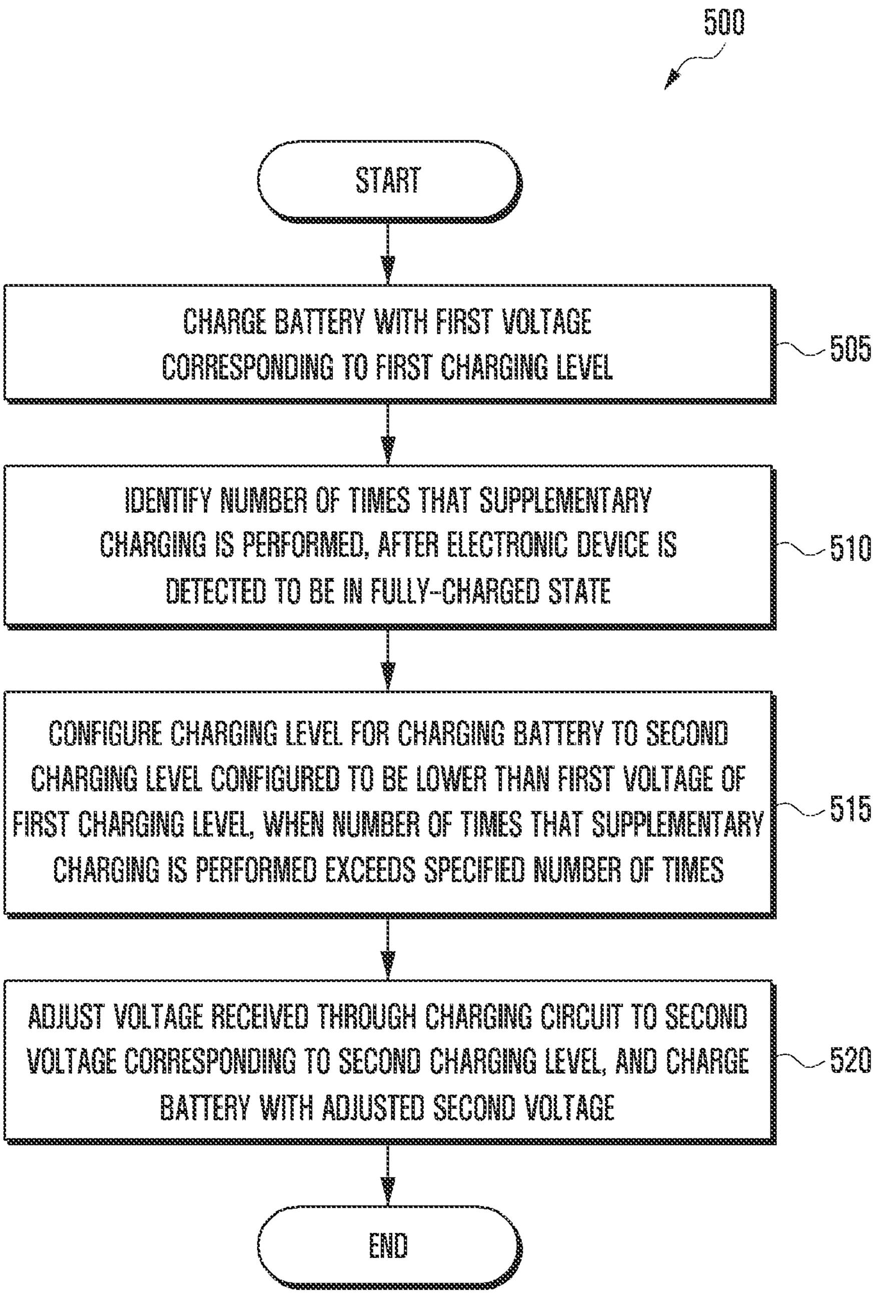
FIG. 5A is a flowchart illustrating a method for increasing a charging level, based on information related to a battery of an electronic device, according to an embodiment of the disclosure.

FIG. 5A is a flowchart illustrating a method for increasing a charging level, based on information related to a battery of an electronic device, according to an embodiment of the disclosure.

FIG. 5A according to various embodiments is a diagram illustrating an embodiment of adjusting a charging level of the battery 370, based on the number of times that supplementary charging is performed after an electronic device (e.g., the electronic device 301 of FIG. 3) is detected to be in a fully-charged state among information related to a battery (e.g., the battery 370 of FIG. 3), which is identified in operation 410 of FIG. 4 described above.

Referring to FIG. 5A, in a method 500, in operation 505, the electronic device 301 may charge the battery 370 with a first voltage corresponding to a first charging level. For example, the first voltage corresponding to the first charging level may be a voltage corresponding to one level among multiple charging levels (e.g., the first level, the second level, the third level, the fourth level, and the fifth level) according to Table 1 described above.

In an embodiment, in operation 510, the electronic device 301 may identify the number of times supplementary charging is performed after the electronic device 301 is detected to be in a fully-charged state. For example, the electronic device 301 may identify whether the battery 370 is in a fully-charged state, based on the capacity of the battery 370. After the battery 370 is identified to be in a fully-charged state, when a voltage of the battery 370 becomes less than or equal to a specified voltage (e.g., a voltage configured for supplementary charging), the electronic device 301 may supplementally charge the battery 370 through the charging circuit 350 by using power received from a power transmission device.

In an embodiment, the electronic device 301 may include a switch unit (e.g., the switch unit 360 of FIG. 3) which controls a connection between the charging circuit 350 and the battery 370. When it is detected that the battery 370 is in a fully-charged state, the electronic device 301 may control the switch unit 360 to be in an off state so that power received from the power transmission device through the charging circuit 350 is not transmitted to the battery 370. After the battery 370 is detected to be in a fully-charged state, when the voltage of the battery 370 becomes less than or equal to a specified voltage, the electronic device 301 may control the switch unit 360 to be in an on state, and supplementally charge the battery 370 by using power received from the power transmission device through the charging circuit 350.

In various embodiments, after supplementary charging of the battery 370 is performed, the battery 370 may be in a fully-charged state again. After the battery 370 is detected to be in a fully-charged state, the electronic device 301 may repeatedly perform an operation of supplementally charging the battery 370 whenever the voltage of the battery 370 falls below a specified voltage. Accordingly, swelling due to overcharging of the battery 370 may occur.

In an embodiment, in operation 515, in order to prevent swelling of the battery 370, the electronic device 301 may configure a charging level for charging the battery 370 to a second charging level configured to be lower than the first voltage of the first charging level when the number of times that supplementary charging is performed exceeds a specified number of times. For example, based on Table 1, the electronic device 301 may configure, to the second charging level, another level configured to be lower than the voltage of the first charging level (e.g., one level among the multiple charging levels (e.g., the first level, the second level, the third level, the fourth level, and the fifth level) of operation 505) among the multiple charging levels.

In an embodiment, in operation 520, the electronic device 301 may adjust a voltage received through the charging circuit 350 to a second voltage corresponding to the second charging level, and charge the battery 370 with the adjusted second voltage.

In various embodiments, although not shown, the electronic device 301 may configure the charging level for charging the battery 370 to the second charging level, and then reconfigure the specified number of times which serves as a reference to adjust the charging level for charging the battery 370, and the number of times that the supplementary charging is performed in operation 515 described above. For example, the electronic device 301 may reconfigure the number of times that the supplementary charging is performed to "0", and reconfigure the specified number of times to a specified number of times corresponding to the second charging level (e.g., when the specified number of times of operation 515 is "2 times", change to "4 times" which is the specified number of times corresponding to the second charging level). The electronic device 301 may repeatedly perform operations 510 to 520 described above, based on the reconfigured number of times (e.g., "0") that the supplementary charging is performed and the reconfigured specified number of times (e.g., "4 times").

In various embodiments, according to repeated performance of operations 510 to 520 described above, when the number of times that the supplementary charging is performed exceeds "4 times", which is the specified number of times corresponding to the second charging level, the electronic device 301 may configure the charging level to a third charging level configured to be lower than the second voltage of the second charging level, and charge the battery 370 with a third voltage corresponding to the third charging level.

In various embodiments, the electronic device 301 may identify the number of times of performing supplementary charging of the battery 370 described above, and when the number of times that the supplementary charging is performed exceeds a specified number of times according to a charging level, perform an operation of charging the battery 370 by stepwise adjusting a voltage received through the charging circuit 350, so that swelling of the battery 370 due to overcharging may be prevented.

Referring to FIG. 5A described above according to various embodiments, it has been described that, after the battery 370 is detected to be in a fully-charged state, a charging level of the battery 370 is adjusted, based on the number of times of performing supplementary charging of the battery 370, but the disclosure is not limited thereto. For example, the electronic device 301 may adjust a charging level of the battery 370, based on a time in which the electronic device 301 is connected to the power transmission device after the battery 370 is detected to be in a fully-charged state as well as the number of times of performing supplementary charging of the battery 370 after the battery 370 is detected to be in a fully-charged state. In relation to an embodiment of adjusting a charging level, based on the number of times of performing supplementary charging of the battery 370 after the battery 370 is detected to be in a fully-charged state and/or a time of being connected to the power transmission device after the battery 370 is detected to be in a fully-charged state, various embodiments will be described with reference to FIG. 5B to be described later.

Figure 5B:
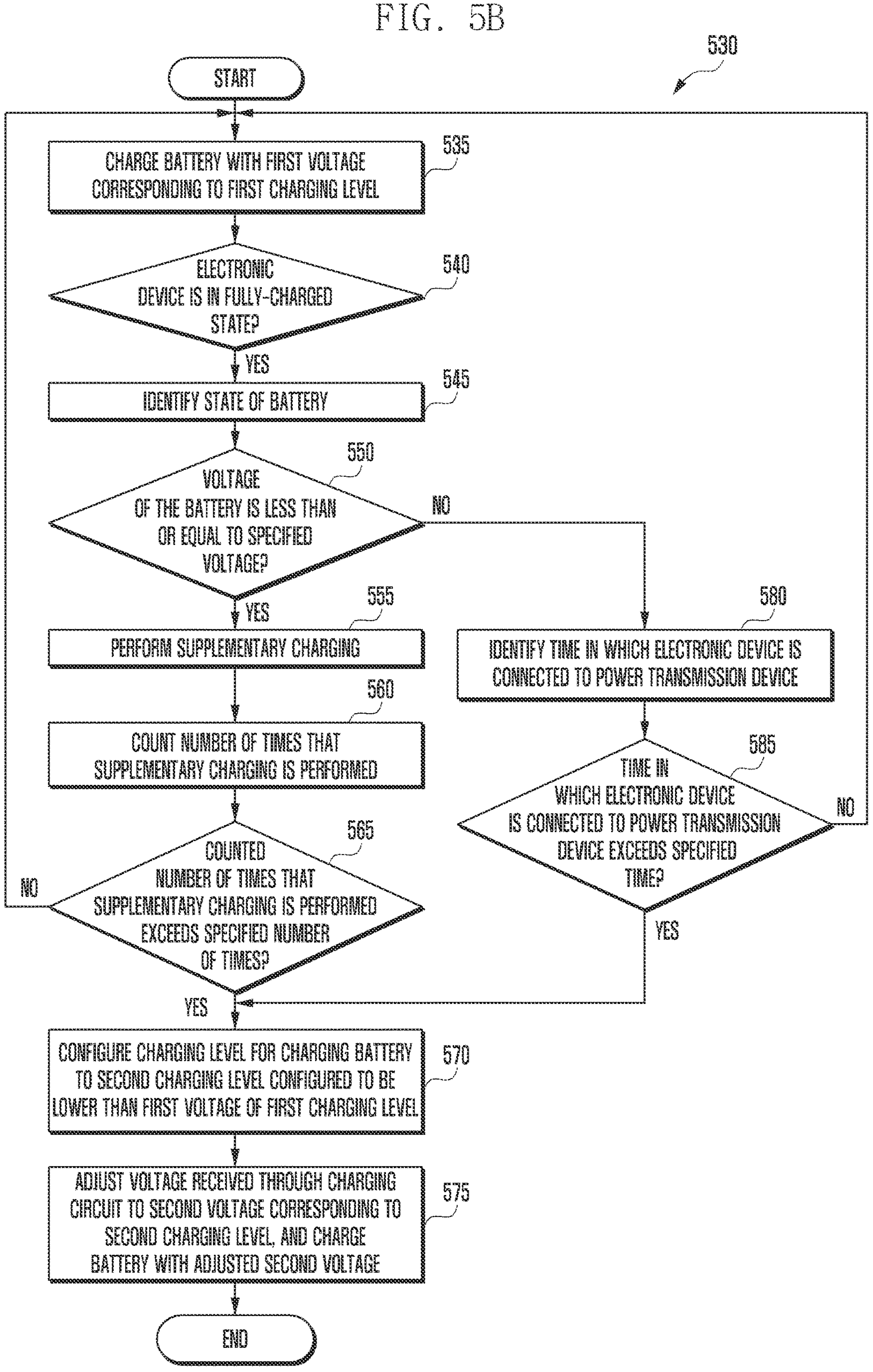
FIG. 5B is a flowchart illustrating a method for increasing a charging level, based on information related to a battery of an electronic device, according to an embodiment of the disclosure.

FIG. 5B is a diagram 530 illustrating a method for increasing a charging level, based on information related to a battery 370 of an electronic device 301, according to an embodiment of the disclosure.

FIG. 5B according to various embodiments is a diagram illustrating an embodiment of adjusting a charging level of the battery 370, based on the number of times that supplementary charging is performed after an electronic device (e.g., the electronic device 301 of FIG. 3) is detected to be in a fully-charged state and/or a time in which the electronic device 301 is connected to a power transmission device after being detected to be in a fully-charged state among information related to a battery (e.g., the battery 370 of FIG. 3), which is identified in operation 410 of FIG. 4 described above.

Since operations 535 to 575 of FIG. 5B according to various embodiments are similar to operations 505 to 520 of FIG. 5A described above, a detailed description thereof may be replaced with the description related to FIG. 5A.

Referring to FIG. 5B, in operation 535, the electronic device 301 may charge the battery 370 with a first voltage corresponding to a first charging level. For example, the first voltage corresponding to the first charging level may be a voltage corresponding to one level among the multiple charging levels according to Table 1 described above. In operation 540, the electronic device 301 may identify whether the electronic device 301 is in a fully-charged state. If it is identified that the electronic device 301 is in a fully-charged state (e.g., YES in operation 540), the electronic device 301 may identify a state of the battery 370 in operation 545. Based on the state of the battery 370, in operation 550, the electronic device 301 may identify (or determine) whether a voltage of the battery 370 is less than or equal to a specified voltage. If it is identified that the voltage of the battery 370 is less than or equal to the specified voltage (e.g., YES in operation 550), the electronic device 301 may perform supplementary charging of the battery 370, in operation 555, and may count the number of times that supplementary charging is performed, in operation 560.

In an embodiment, in operation 565, the electronic device 301 may identify whether the counted number of times that the supplementary charging is performed exceeds a specified number of times. For example, the specified number of times in operations 565 may refer to a specified number of times configured in the first charging level (e.g., one level among the multiple charging levels according to Table 1 described above) in operation 535.

In an embodiment, when the counted number of times that the supplementary charging is performed exceeds the specified number of times (e.g., YES in operation 565), in operation 570, the electronic device 301 may configure a charging level for charging the battery 370 to a second charging level configured to be lower than the first voltage of the first charging level. In operation 575, the electronic device 301 may adjust a voltage received through the charging circuit 350 to a second voltage corresponding to the second charging level, and charge the battery 370 with the adjusted second voltage.

In various embodiments, although not shown, when the charging level for charging the battery 370 is configured to the second charging level on the basis that the counted number of times that the supplementary charging is performed exceeds the specified number of times, the electronic device 301 may reconfigure the specified number of times which serves as a reference for adjusting the charging level, and the number of times that the supplementary charging is performed in operation 565 described above. For example, the electronic device 301 may reconfigure the number of times that the supplementary charging is performed to "0", and reconfigure the specified number of times to a specified number of times corresponding to the second charging level (e.g., when the specified number of times of operation 535 is "2 times", change to "4 times" which is the specified number of times corresponding to the second charging level). The electronic device 301 may repeatedly perform operations 540 to 565 described above, based on the reconfigured number of times (e.g., "0") that the supplementary charging is performed and the reconfigured specified number of times (e.g., "4 times").

In an embodiment, when the counted number of times that the supplementary charging is performed does not exceed the specified number of times (e.g., NO in operation 565), the electronic device 301 may branch to operation 535 and repeatedly perform operations 535 to 565.

In an embodiment, if it is identified that the voltage of the battery 370 is not less than or equal to the specified voltage (e.g., NO in operation 550), in operation 580, the electronic device 301 may identify a time in which the electronic device 301 is connected to the power transmission device. In operation 585, the electronic device 301 may identify whether the time in which the electronic device 301 is connected to the power transmission device exceeds a specified time. For example, the specified time in operations 585 may refer to a specified time configured in the first charging level (e.g., one level among the multiple charging levels according to Table 1 described above) in operation 535.

In an embodiment, when the time of being connected to the power transmission device exceeds the specified time (e.g., YES in operation 585), the electronic device 301 may perform operation 570 of configuring the above-described charging level for charging the battery 370 to the second charging level configured to be lower than the first voltage of the first charging level, and operation 575 of adjusting the voltage received through the charging circuit 350 to the second voltage corresponding to the second charging level and charging the battery 370 with the adjusted second voltage. When the time of being connected to the power transmission device does not exceed the specified time (e.g., NO in operation 585), the electronic device 301 may branch to operation 535.

In various embodiments, although not shown, when the charging level for charging the battery 370 is configured to the second charging level on the basis that the time in which the electronic device 301 is connected to the power transmission device exceeds the specified time, the electronic device 301 may reconfigure the specified time which serves as a reference for adjusting the charging level, and the time in which the electronic device 301 is connected to the power transmission device in operation 585 described above. For example, the electronic device 301 may reconfigure the time in which the electronic device 301 is connected to the power transmission device to "0", and reconfigure the specified time (e.g., when the specified time of operation 585 is "24 hours", change to "48 hours", which is a specified time corresponding to the second charging level). The electronic device 301 may repeatedly perform operations 580 and 585 described above, based on the reconfigured time (e.g., "0") that the electronic device 301 is connected to the power transmission device and the reconfigured specified time (e.g., "48 hours").

In various embodiments, as above-described operations 540 to 565, 580, and 585 are repeatedly performed based on the reconfigured information (e.g., the number of times that the supplementary charging is performed, the specified number of times, the time in which the electronic device 301 is connected to the power transmission device, and the specified time), when the number of times that the supplementary charging is performed exceeds "4 times", which is the specified number of times corresponding to the second charging level, and/or when the time in which the electronic device 301 is connected to the power transmission device exceeds "48 hours", the electronic device 301 may configure the charging level to a third charging level configured to be lower than the second voltage of the second charging level and charge the battery 370 with a third voltage corresponding to the third charging level.

Referring to FIG. 5B according to various embodiments, although it has been described that when the counted number of times that the supplementary charging is performed exceeds the specified number of times (e.g., YES in operation 565), the charging level for charging the battery 370 is configured to the second charging level configured to be lower than the first voltage of the first charging level in operation 570, the disclosure is not limited thereto. For example, when the counted number of times that the supplementary charging is performed exceeds the specified number of times (e.g., YES in operation 565), the electronic device 301 may identify the time in which the electronic device 301 is connected to the power transmission device in operation 580. If it is identified that the time in which the electronic device 301 is connected to the power transmission device exceeds the specified time (e.g., YES in operation 585), the electronic device 301 may perform an operation of configuring the charging level for charging the battery 370 to the second charging level configured to be lower than the first voltage of the first charging level in operation 570. In other words, the electronic device 301 may identify not only the number of times that supplementary charging of the battery 370 is performed but also the time in which the electronic device 301 is connected to the power transmission device, and adjust a voltage for charging the battery 370, based on the number of times and the time, so that swelling of the battery 370 which may occur due to overcharging can be prevented.

Figure 6:
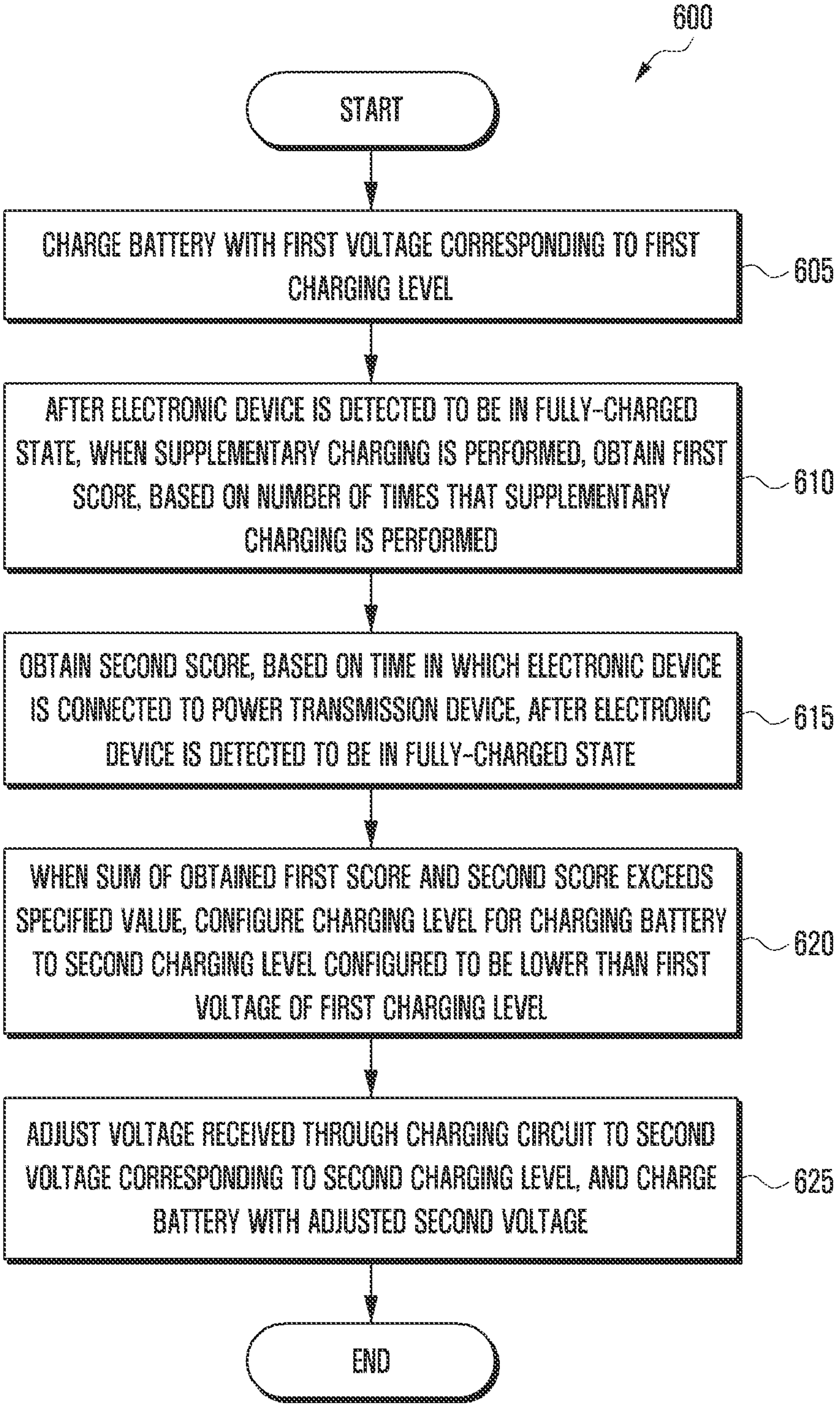
FIG. 6 is a flowchart illustrating a method for increasing a charging level, based on information related to a battery of an electronic device, according to an embodiment of the disclosure.

FIG. 6 is a diagram illustrating a method for increasing a charging level, based on information related to a battery of an electronic device, according to an embodiment of the disclosure.

Referring to FIG. 6, in a method 600, in operation 605, an electronic device (e.g., the electronic device 301 of FIG. 3) may charge a battery (e.g., the battery 370 of FIG. 3) with a first voltage corresponding to a first charging level. For example, the first voltage corresponding to the first charging level may be a voltage corresponding to one level among the multiple charging levels according to Table 1 described above.

In an embodiment, in operation 610, after the electronic device 301 is detected to be in a fully-charged state, when supplementary charging is performed, the electronic device 301 may obtain a first score, based on the number of times that supplementary charging is performed.

In various embodiments, a score according to the number of times that the supplementary charging is performed may be pre-mapped and stored in a memory (e.g., the memory 320 of FIG. 3). For example, the score may be configured to increase by 10 points (e.g., 10 points, 20 points, 30 points, and . . . ) whenever the number of times that the supplementary charging is performed increases (e.g., 1 time, 2 times, 3 times, and . . . ). However, the disclosure is not limited thereto.

An operation of identifying the number of times that the supplementary charging is performed, which is a basis for obtaining the first score in operation 610 according to various embodiments, is similar to operations 545 to 560 of FIG. 5B described above, and thus a detailed description thereof may be substituted with the description related to FIG. 5B.

In an embodiment, in operation 615, the electronic device 301 may obtain a second score, based on a time in which the electronic device 301 is connected to a power transmission device, after the electronic device 301 is detected to be in a fully-charged state.

In various embodiments, a score according to the time in which the electronic device 301 is connected to the power transmission device may be pre-mapped and stored in the memory 320. For example, the score may be configured to increase by 10 points (e.g., 10 points, 20 points, 30 points, and . . . ) whenever the time in which the electronic device 301 is connected to the power transmission device increases (e.g., 1 hour, 2 hours, 3 hours, and . . . ). However, the disclosure is not limited thereto.

An operation of identifying the time in which the electronic device 301 is connected to the power transmission device, which is a basis for obtaining the second score in operation 615 according to various embodiments, is similar to operations 580 and 585 of FIG. 5B described above, and thus a detailed description thereof may be substituted with the description related to FIG. 5B.

In an embodiment, in operation 620, when the sum of the obtained first score and second score exceeds a specified value, the electronic device 301 may configure a charging level for charging the battery 370 to a second charging level configured to be lower than the first voltage of the first charging level. However, the disclosure is not limited thereto.

In various embodiments, the specified value for adjusting the charging level may be pre-configured. For example, according to Table 1, a specified value adjusted from the first level to the second level may be pre-configured to 50 points, a specified value adjusted from the second level to the third level may be pre-configured to 100 points, a specified value adjusted from the third level to the fourth level may be pre-configured to 150 points, and a specified value adjusted from the fourth level to the fifth level may be pre-configured to 200 points. However, the disclosure is not limited thereto. The electronic device 301 may configure, to the second charging level, a level corresponding to a specified value exceeding the sum of the obtained first score and second score.

In an embodiment, in operation 625, the electronic device 301 may adjust a voltage received through a charging circuit (e.g., the charging circuit 350 of FIG. 3) to a second voltage corresponding to the second charging level, and charge the battery 370 with the adjusted second voltage.

Figure 7:
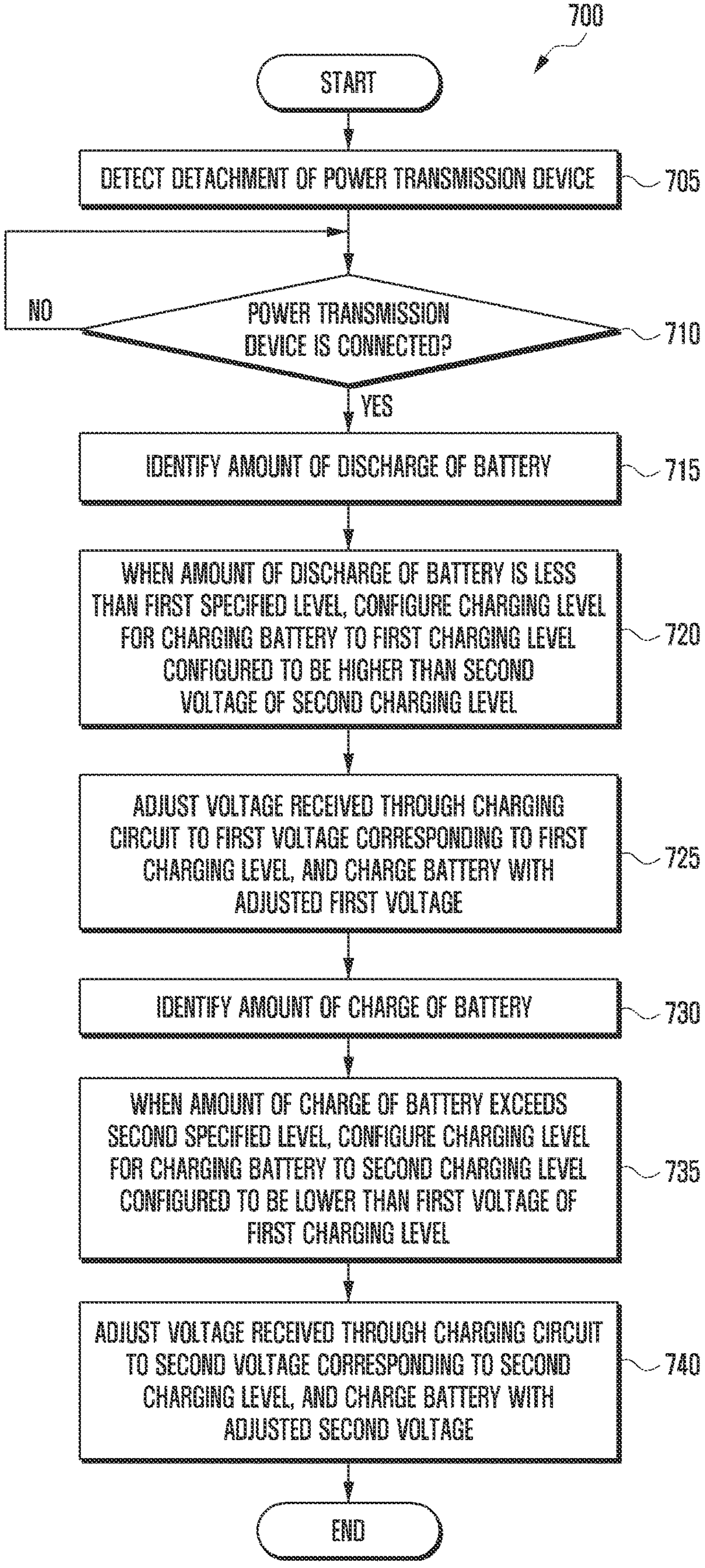
FIG. 7 is a flowchart illustrating a method for lowering a charging level, based on information related to a battery of an electronic device, according to an embodiment of the disclosure.

FIG. 7 is a diagram illustrating a method for lowering a charging level, based on information related to a battery of an electronic device, according to an embodiment of the disclosure.

FIG. 7 according to various embodiments may illustrate additional operations of FIGS. 5A, 5B, and 6 described above.

FIG. 7 according to various embodiments is a diagram illustrating an embodiment of adjusting a charging level of the battery 370, based on the amount of discharge of the battery 370 after detachment of a power transmission device is detected, and the capacity of the battery 370 identified by the charging of the battery 370 performed according to reconnection with the power transmission device among information related to a battery (e.g., the battery 370 of FIG. 3), which is identified in operation 410 of FIG. 4 described above.

Referring to FIG. 7, in a method 700, in operation 705, an electronic device (e.g., the electronic device 301 of FIG. 3) may detect detachment of a power transmission device. After the detachment of the power transmission device is detected, in operation 710, the electronic device 301 may identify whether the electronic device is connected to the power transmission device. If it is identified that the power transmission device is not connected (e.g., NO in operation 710), the electronic device 301 may repeatedly perform operation 710.

In an embodiment, if it is identified that the power transmission device is connected (e.g., YES in operation 710), in operation 715, the electronic device 301 may identify the amount of discharge of the battery 370. For example, the electronic device 301 may identify the amount of discharge of the battery 370, based on an SOC, a voltage difference of the battery 370, or a discharging current. The amount of discharge of the battery 370 may refer to the amount of discharge identified before performing a charging operation according to reconnection with the power transmission device after the detachment of the power transmission device is detected.

In an embodiment, in operation 720, when the amount of discharge of the battery 370 is less than a first specified level, the electronic device 301 may configure a charging level for charging the battery 370 to a first charging level configured to be higher than a second voltage of a second charging level. For example, the first specified level of operation 720 may refer to a specified capacity level related to the amount of discharge of the battery 370 configured to the second charging level (e.g., another level among the multiple charging levels according to Table 1 described above). In an embodiment, when the amount of discharge of the battery 370 is less than the first specified level, an operation of performing rapid charging so that the capacity of the battery 370 becomes a predetermined capacity may be required. To this end, the electronic device 301 may configure the charging level for charging the battery 370 to the first charging level configured to be higher than the second voltage of the second charging level.

In various embodiments, although not shown, the electronic device 301 may configure the charging level for charging the battery 370 to the first charging level, and then reconfigure the first specified level which serves as a reference for adjusting the charging level, and the amount of discharge of the battery 370 in operation 720 described above. For example, the electronic device 301 may reset the amount of discharge of the battery 370, and reconfigure the first specified level to a specified level corresponding to the first charging level (e.g., change the first specified level of operation 720 to the specified level corresponding to the first charging level). The electronic device 301 may repeatedly perform operations 715 and 720 described above, based on the reset amount of discharge of the battery 370 and the reconfigured specified level corresponding to the first charging level.

In various embodiments, when the amount of discharge of the battery 370 is detected to be less than the specified level corresponding to the first charging level by repeatedly performing operations 715 and 720 described above, based on the reset amount of discharge of the battery 370 and the reconfigured specified level corresponding to the first charging level, the electronic device 301 may configure the charging level for charging the battery 370 to the second charging level configured to be lower than a first voltage of the first charging level.

In an embodiment, in operation 725, the electronic device 301 may adjust a voltage received through a charging circuit (e.g., the charging circuit 350 of FIG. 3) to the first voltage corresponding to the first charging level, and charge the battery 370 with the adjusted first voltage. In operation 730, the electronic device 301 may identify the amount of charge of the battery 370. For example, the amount of charge of the battery 370 may refer to the capacity (e.g., the remaining capacity of the battery 370, a state of charge (SOC), or a level of the battery 370) of the battery 370 according to charging of the battery 370 performed by reconnection with the power transmission device after the detachment of the power transmission device is detected.

In an embodiment, in operation 735, when the amount of charge of the battery 370 exceeds a second specified level, the electronic device 301 may configure the charging level for charging the battery 370 to the second charging level configured to be lower than the first voltage of the first charging level. In operation 740, the electronic device 301 may adjust the voltage received through the charging circuit 350 to the second voltage corresponding to the second charging level, and charge the battery 370 with the adjusted second voltage. Operation 740 according to various embodiments may be operation 520 of FIG. 5A, operation 575 of FIG. 5B, and operation 625 of FIG. 6 described above.

In various embodiments, although not shown, when the amount of charge of the battery 370 does not exceed the second specified level, the electronic device 301 may repeatedly perform the operation of charging the battery 370 with the adjusted first voltage in operation 725 and identifying the amount of charge of the battery 370 in operation 730.

In various embodiments, by performing an operation of adjusting the charging level for charging the battery 370, based on whether the amount of discharge of the battery 370 is less than the first specified level and whether the amount of charge of the battery 370 exceeds the second specified level, the use time of the electronic device 301 can be improved while preventing swelling of the battery of the electronic device 301.

Figure 8:
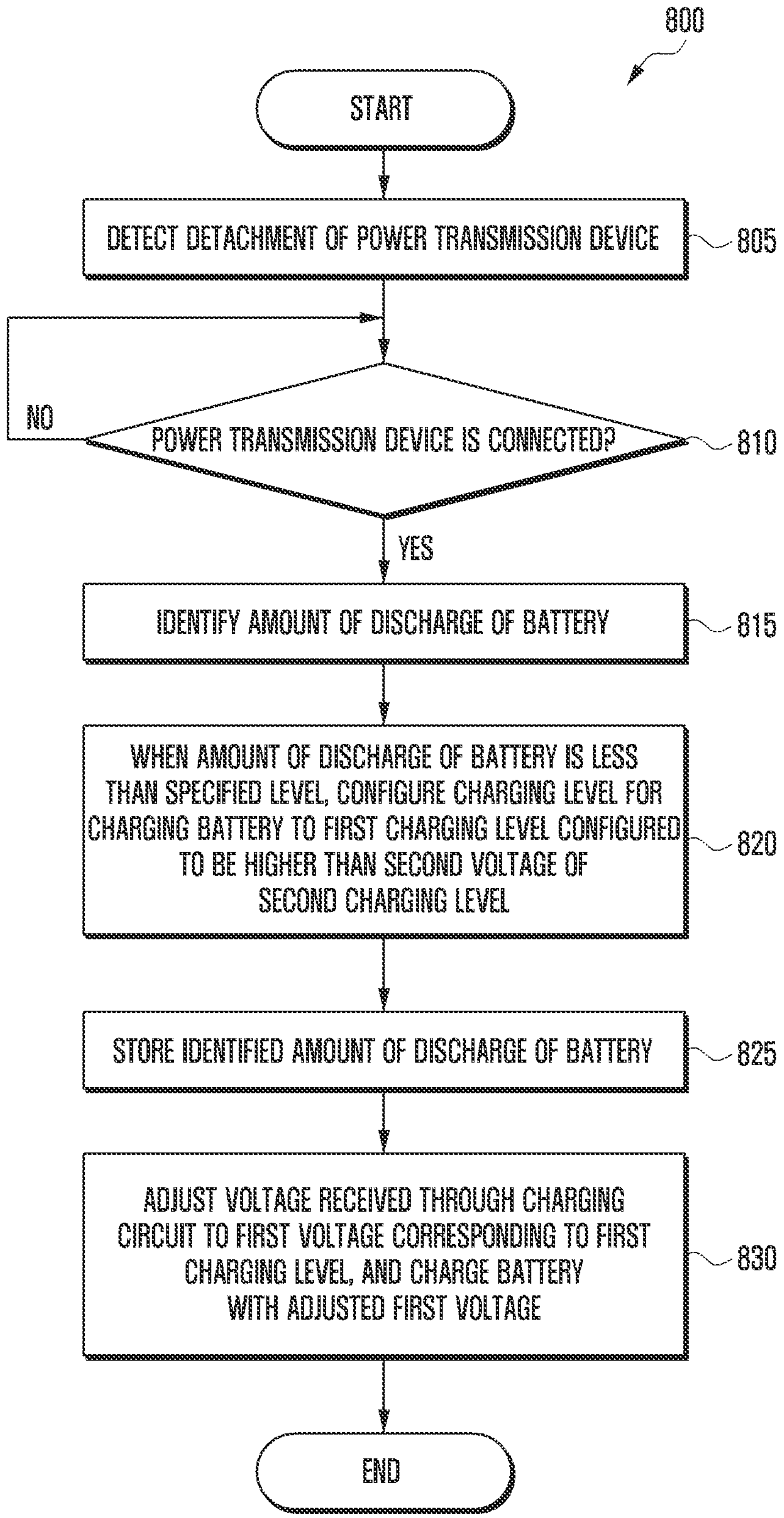
FIG. 8 is a flowchart illustrating a method for lowering a charging level, based on information related to a battery of an electronic device, according to an embodiment of the disclosure.

FIG. 8 is a diagram illustrating a method for lowering a charging level, based on information related to a battery of an electronic device, according to an embodiment of the disclosure.

FIG. 8 according to various embodiments may illustrate additional operations of FIGS. 5A, 5B, and 6 described above.

Referring to FIG. 8, in a method 800, an electronic device (e.g., the electronic device 301 of FIG. 3) may detect detachment of a power transmission device in operation 805, and then identify whether the electronic device is connected to the power transmission device in operation 810. For example, the electronic device 301 may identify whether the power transmission device is connected thereto via a wire in order to charge the battery 370 through an interface (e.g., the interface 340 of FIG. 3), for example, a wired interface. For another example, the electronic device 301 may identify whether the power transmission device is wirelessly connected thereto in order to charge the battery 370 through the interface 340, for example, a wireless interface.

In an embodiment, if it is identified that the power transmission device is not connected (e.g., NO in operation 810), the electronic device 301 may repeatedly perform operation 810. If it is identified that the power transmission device is connected (e.g., YES in operation 810), the electronic device 301 may identify the amount of discharge of the battery 370 in operation 815. In operation 820, when the identified amount of discharge of the battery 370 is less than a specified level, the electronic device 301 may configure a charging level for charging the battery 370 to a first charging level configured to be higher than a second voltage of a second charging level.

In an embodiment, in operation 825, the electronic device 301 may store the identified amount of discharge of the battery 370 in a memory (e.g., the memory 320 of FIG. 3). For example, the electronic device 301 may accumulate the identified amount of discharge of the battery 370 and store the accumulated amount of discharge in the memory 320. The operation of accumulating and storing the amount of discharge of the battery 370 according to various embodiments may be an operation for identifying a user's usage pattern related to charging of the battery 370.

In an embodiment, in operation 830, the electronic device 301 may adjust a voltage received through a charging circuit (e.g., the charging circuit 350 of FIG. 3) to a first voltage corresponding to the first charging level, and charge the battery 370 with the adjusted first voltage.

In various embodiments, through operations 805 to 830, the electronic device 301 may accumulate the amount of discharge of the battery 370 and store the accumulated amount of discharge in the memory 320. The electronic device 301 may adjust the charging level for charging the battery 370, based on the amount of discharge of the battery 370 accumulated and stored in the memory 320. For example, assuming that a score is configured to increase by 1 point per the amount of discharge of the battery 370 (e.g., 1%, 2%, and . . . ), when the amount of discharge of the battery 370 is 60%, the electronic device 301 may obtain a score of 60 points. The electronic device 301 may store the amount of discharge of the battery 370, for example, 60%, in the memory 320. Thereafter, when, after the battery 370 is charged via connection with the power transmission device, the detachment of the power transmission device is detected again, the electronic device 301 may identify the amount of discharge of the battery 370 until before the power transmission device is reconnected thereto. When the identified amount of discharge of the battery 370 until before the reconnection with the power transmission device is 40%, the electronic device 301 may obtain a score of 40 points. The electronic device 301 may accumulate the amount of discharge of the battery 370, for example, 40%, and store the same in the memory 320. The electronic device 301 may compare the sum of the obtained scores (e.g., 60 points and 40 points) based on the amount of discharge of the battery 370 with a reference value configured for each level in order to adjust the charging level. Based on a result of the comparison, the electronic device 301 may adjust the charging level for charging the battery 370 to a level exceeding the obtained scores among reference values in which the obtained scores are configured for multiple charging levels, respectively.

In FIG. 8 according to various embodiments, the electronic device 301 may accumulate and store the amount of discharge of the battery 370, and analyze a user's usage pattern related to charging of the battery 370, based on the stored amount of discharge. The electronic device 301 may adjust the charging level for charging the battery 370, based on the user's usage pattern related to charging of the battery 370, and thus predict the usability of the battery 370 according to a user pattern and control charging of the battery 370.

Figure 9:
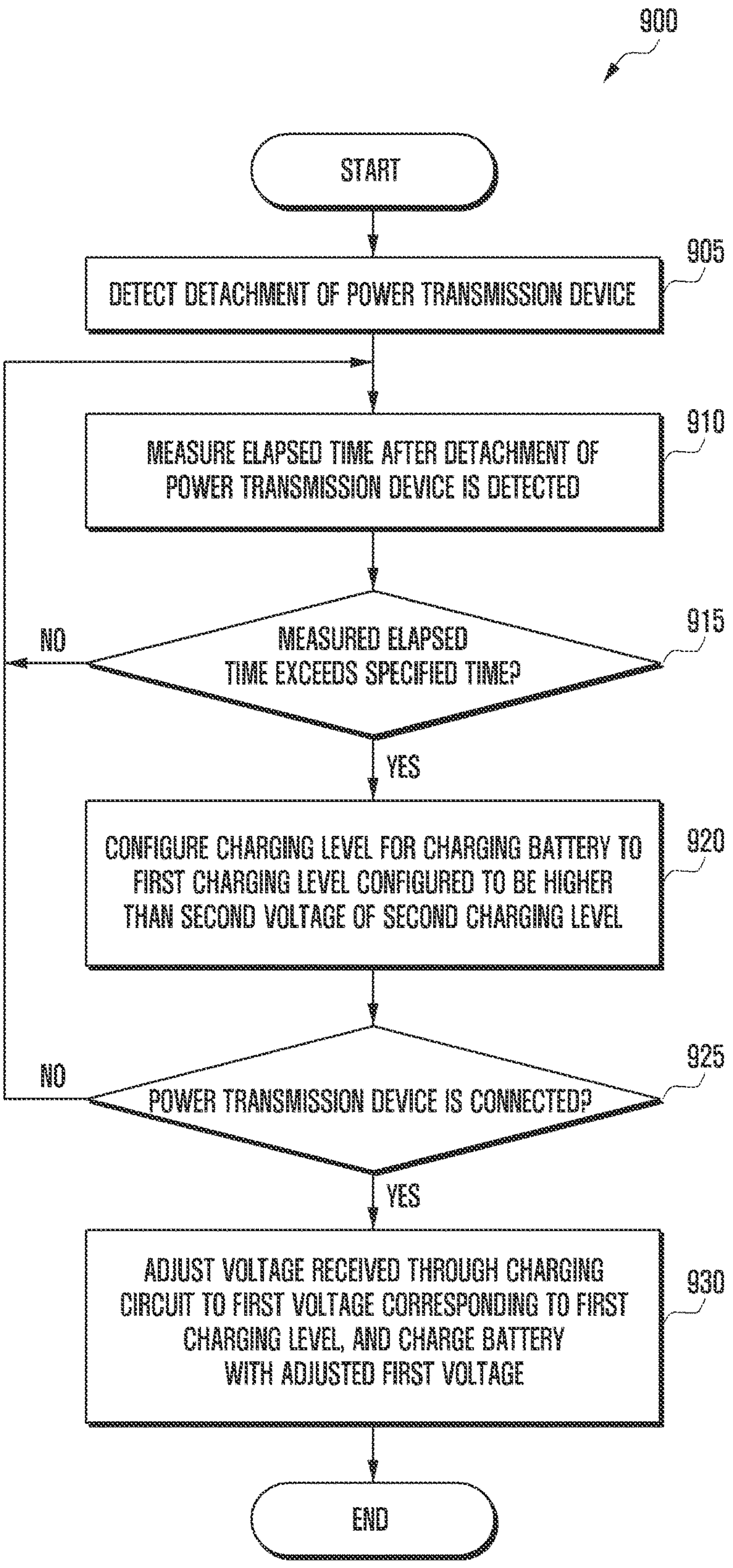
FIG. 9 is a flowchart illustrating a method for lowering a charging level, based on information related to a battery of an electronic device, according to an embodiment of the disclosure.

FIG. 9 is a diagram illustrating a method for lowering a charging level, based on information related to a battery of an electronic device, according to an embodiment of the disclosure.

FIG. 9 according to various embodiments may illustrate additional operations of FIGS. 5A, 5B, and 6 described above.

FIG. 9 according to various embodiments is a diagram illustrating an embodiment of adjusting a charging level of the battery 370, based on an elapsed time after detachment of a power transmission device is detected among information related to a battery (e.g., the battery 370 of FIG. 3), which is identified in operation 410 of FIG. 4 described above.

Referring to FIG. 9, in a method 900, in operation 905, an electronic device (e.g., the electronic device 301 of FIG. 3) may detect detachment of a power transmission device. In operation 910, the electronic device 301 may measure an elapsed time after the detachment of the power transmission device is detected. In operation 915, the electronic device 301 may determine whether the measured elapsed time exceeds a specified time. For example, the above-described operation 915 may be an operation of comparing the measured elapsed time with an elapsed time configured for each level (e.g., the first level, the second level, the third level, the fourth level, and the fifth level according to Table 1) in order to adjust a charging level.

In an embodiment, when the measured elapsed time exceeds the specified time (e.g., YES in operation 915), in operation 920, the electronic device 301 may configure a charging level for charging the battery 370 to a first charging level configured to be higher than a second voltage of a second charging level.

In various embodiments, when the measured elapsed time after the detachment of the power transmission device is detected exceeds the specified time (e.g., YES in operation 915), the battery 370 is considered to be used a lot, and an operation of rapid charging so that the capacity of the battery 370 becomes a predetermined capacity may be required. To this end, the electronic device 301 may configure the charging level for charging the battery 370 to the first charging level configured to be higher than the second voltage of the second charging level.

In an embodiment, if the measured elapsed time after the detachment of the power transmission device is detected does not exceed the specified time (e.g., NO in operation 915) (e.g., if the measured elapsed time is less than or equal to the specified time), the electronic device 301 may branch to operation 910 and repeatedly perform an operation of measuring an elapsed time after detachment of the power transmission device is detected and an operation of identifying whether the measured elapsed time exceeds the specified time in operation 915.

In an embodiment, in operation 925, the electronic device 301 may identify whether the electronic device is connected to the power transmission device. If it is identified that the power transmission device is connected (e.g., YES in operation 925), in operation 930, the electronic device 301 may adjust a voltage received through a charging circuit (e.g., the charging circuit 350 of FIG. 3) to a first voltage corresponding to the first charging level, and charge the battery 370 with the adjusted first voltage.

In an embodiment, if it is identified that the electronic device 301 is not connected to the power transmission device (e.g., NO in operation 925), the electronic device 301 may branch to operation 910 and repeatedly perform operations 910 to 925.

Figure 10:
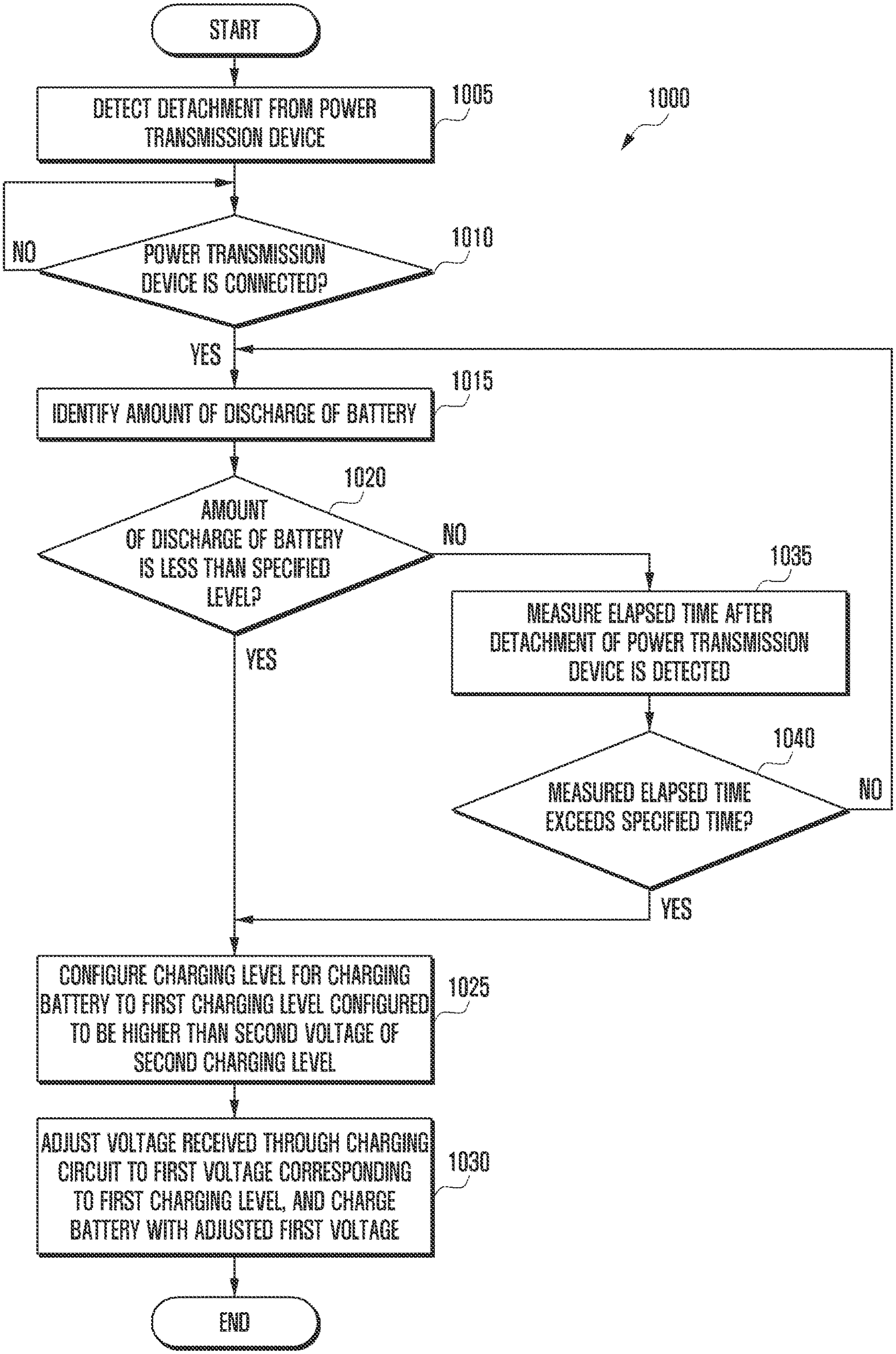
FIG. 10 is a flowchart illustrating a method for lowering a charging level, based on information related to a battery of an electronic device, according to an embodiment of the disclosure.

FIG. 10 is a diagram illustrating a method for lowering a charging level, based on information related to a battery of an electronic device, according to an embodiment of the disclosure.

FIG. 10 according to various embodiments may illustrate additional operations of FIGS. 5A, 5B, and 6 described above.

FIG. 10 according to various embodiments is a diagram illustrating an embodiment of adjusting a charging level of the battery 370, based on the amount of discharge of the battery 370 after detachment of a power transmission device is detected, and/or an elapsed time after the detachment of the power transmission device is detected, among information related to a battery (e.g., the battery 370 of FIG. 3), which is identified in operation 410 of FIG. 4 described above.

Referring to FIG. 10, in a method 1000, an electronic device (e.g., the electronic device 301 of FIG. 3) may detect detachment from a power transmission device in operation 1005, and then identify whether the electronic device is connected to the power transmission device in operation 1010. For example, the electronic device 301 may identify whether the electronic device is connected to the power transmission device by wire or wirelessly through an interface (e.g., the interface 340 of FIG. 3). If it is identified that the power transmission device is not connected through the interface 340 (e.g., NO in operation 1010), the electronic device 301 may repeatedly perform operation 1010. In a case of being connected to the power transmission device through the interface 340 (e.g., YES in operation 1010), the electronic device 301 may identify the amount of discharge of the battery 370 in operation 1015, and identify whether the identified amount of discharge of the battery 370 is less than a specified level in operation 1020. If it is identified that the identified amount of the battery 370 is less than the specified level (e.g., YES in operation 1020), in operation 1025, the electronic device 301 may configure a charging level for charging the battery 370 to a first charging level configured to be higher than a second voltage of a second charging level.

In an embodiment, in operation 1030, the electronic device 301 may adjust a voltage received through a charging circuit (e.g., the charging circuit 350 of FIG. 3) to a first voltage corresponding to the first charging level, and charge the battery 370 with the adjusted first voltage.

Since operations 1005 to 1030 of FIG. 10 according to various embodiments are similar to operations 705 to 725 of FIG. 7 described above, a detailed description thereof may be replaced with the description related to FIG. 7.

In various embodiments, although not shown, when the charging level for charging the battery 370 is configured to the first charging level, based on the identification that the amount of discharge of the battery 370 is less than the specified level, the electronic device 301 may reconfigure the specified level which serves as a reference for adjusting the charging level, and the amount of discharge of the battery 370 in operation 1020 described above. For example, the electronic device 301 may reset the amount of discharge of the battery 370 and reconfigure the specified level to a specified level corresponding to the first charging level. The electronic device 301 may repeatedly perform operations 1015 and 1020 described above, based on the reset amount of discharge of the battery 370 and the reconfigured specified level.

In an embodiment, if it is identified that the amount of discharge of the battery 370 is not less than the specified level (e.g., NO in operation 1020), in operation 1035, the electronic device 301 may measure an elapsed time after the detachment of the power transmission device is detected. In operation 1040, the electronic device 301 may identify whether the measured elapsed time exceeds a specified time. When the measured elapsed time exceeds the specified time (e.g., YES in operation 1040), the electronic device 301 may configure the charging level for charging the battery 370 to the first charging level configured to be higher than the second voltage of the second charging level, in operation 1025, and adjust the voltage received through the charging circuit 350 to the first voltage corresponding to the first charging level and charge the battery 370 with the adjusted first voltage, in operation 1030.

Since operations 1035 and 1040 of FIG. 10 according to various embodiments are similar to operations 915 and 920 of FIG. 9 described above, a detailed description thereof may be replaced with the description related to FIG. 9.

In an embodiment, if the measured elapsed time does not exceed the specified time (e.g., NO in operation 1040), the electronic device 301 may branch to operation 1015 and repeatedly perform operations 1015, 1020, 1035, and 1040.

In various embodiments, although not shown, when the charging level for charging the battery 370 is configured to the first charging level on the basis that the elapsed time after the detachment of the power transmission device is detected exceeds the specified time, the electronic device 301 may reconfigure the specified time which serves as a reference for adjusting the charging level, and the elapsed time after the electronic device 301 detects detachment of the power transmission device in operation 1040 described above. For example, the electronic device 301 may reset the elapsed time after the detachment of the power transmission device is detected, and reconfigure the specified time (e.g., when the specified time of operation 1040 is "48 hours", change to "24 hours", which is a specified time corresponding to the first charging level). The electronic device 301 may repeatedly perform operations 1035 and 1040 described above, based on the reset elapsed time (e.g., "0") and the specified time (e.g., "24 hours").

In various embodiments, as above-described operations 1015, 1020, 1035, and 1040 are repeatedly performed based on the reconfigured information (e.g., the amount of discharge of the battery 370, a specified level, an elapsed time after the detachment of the power transmission device is detected, and a specified time), when the amount of discharge of the battery 370 is less than the specified level corresponding to the first charging level, and/or when the elapsed time after the detachment of the power transmission device is detected exceeds "24 hours", the electronic device 301 may configure the charging level to a third charging level configured to be lower than the first voltage of the first charging level, and charge the battery 370 with a third voltage corresponding to the third charging level.

Referring to FIG. 10 according to various embodiments, although it has been described that when the amount of discharge of the battery 370 is less than the specified level (e.g., YES in operation 1020), the charging level for charging the battery 370 in operation 1025 is configured to the first charging level configured to be higher than the second voltage of the second charging level, the disclosure is not limited thereto. For example, when the amount of discharge of the battery 370 is less than the specified level (e.g., YES in operation 1020), the electronic device 301 may measure an elapsed time after the detachment of the power transmission device is detected in operation 1035. If it is identified that the elapsed time after the detachment of the power transmission device is detected exceeds the specified time (e.g., YES in operation 1040), the electronic device 301 may perform an operation of configuring the charging level for charging the battery 370 in operation 1025 to the first charging level configured to be higher than the second voltage of the second charging level. In other words, the electronic device 301 may measure not only the amount of discharge of the battery 370 but also an elapsed time after the detachment of the power transmission device is detected, and adjust a voltage for charging the battery 370, based on the amount of discharge and the elapsed time, so that swelling of the battery 370 which may occur due to overcharging can be prevented.

Figure 11:
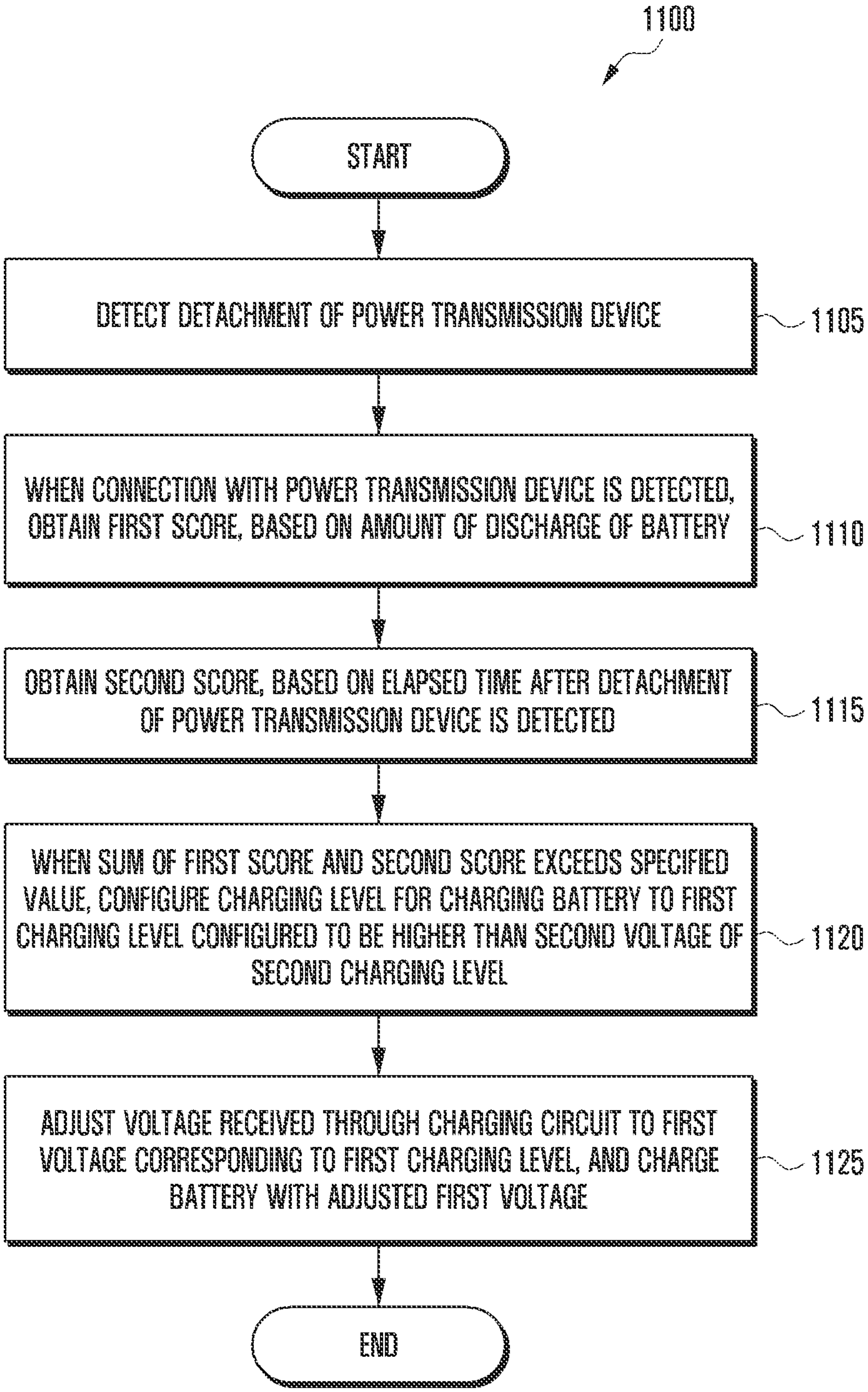
FIG. 11 is a flowchart illustrating a method for lowering a charging level, based on information related to a battery of an electronic device, according to an embodiment of the disclosure.

FIG. 11 is a diagram illustrating a method for lowering a charging level, based on information related to a battery of an electronic device, according to an embodiment of the disclosure.

FIG. 11 according to various embodiments may illustrate additional operations of FIGS. 5A, 5B, and 6 described above.

Referring to FIG. 11, in operation 1105, an electronic device (e.g., the electronic device 301 of FIG. 3) may detect detachment of a power transmission device. When a connection with the power transmission device is detected, in operation 1110, the electronic device 301 may obtain a first score, based on the amount of discharge of a battery (e.g., the battery 370 of FIG. 3). For example, the electronic device 301 may identify the amount of discharge of the battery 370, based on an SOC, a voltage difference of the battery 370, or a discharging current, and obtain the first score according to the amount of discharge.

In various embodiments, a score according to the amount of discharge of the battery 370 may be pre-mapped and stored in a memory (e.g., the memory 320 of FIG. 3). For example, the score may be configured to increase by 1 point (e.g., 1 point, 2 points, 3 points, and . . . ) per the amount of discharge of the battery 370 (e.g., 1%, 2%, 3%, and . . . ). However, the disclosure is not limited thereto.

In an embodiment, in operation 1115, the electronic device 301 may obtain a second score, based on an elapsed time after the detachment of the power transmission device is detected.

In various embodiments, a score according to the elapsed time after the electronic device 301 detects the detachment of the power transmission device may be pre-mapped and stored in the memory 320. For example, the score may be configured to increase by 10 points (e.g., 10 points, 20 points, 30 points, and . . . ) whenever the elapsed time after the detachment of the power transmission device is detected increases (e.g., 1 hour, 2 hours, 3 hours, and . . . ). However, the disclosure is not limited thereto.

In an embodiment, in operation 1120, when the sum of the first score and second score exceeds a specified value, the electronic device 301 may configure a charging level for charging the battery 370 to a first charging level configured to be higher than a second voltage of a second charging level.

In various embodiments, a specified value for adjusting the charging level may be pre-configured, and the electronic device 301 may configure, to the second charging level, a level corresponding to a specified value exceeding the sum of the obtained first score and second score.

In operation 1125, the electronic device 301 may adjust a voltage received through a charging circuit (e.g., the charging circuit 350 of FIG. 3) to a first voltage corresponding to the first charging level, and charge the battery 370 with the adjusted first voltage.

A charging method of an electronic device according to various embodiments may include charging a battery with a first voltage corresponding to a first charging level, identifying the number of times that supplementary charging is performed, after the electronic device is detected to be in a fully-charged state, when the number of times that the supplementary charging is performed exceeds a specified number of times, configuring a charging level for charging the battery to a second charging level configured to be lower than the first voltage of the first charging level, and adjusting a voltage received from a power transmission device through a charging circuit to a second voltage corresponding to the second charging level and charging the battery with the adjusted second voltage.

In various embodiments, the configuring to the second charging level may include identifying, when the number of times that the supplementary charging is performed exceeds the specified number of times, a time of being connected to the power transmission device, and when the time of being connected to the power transmission device exceeds a specified time, configuring the charging level for charging the battery to the second charging level configured to be lower than the first voltage of the first charging level.

The charging method of the electronic device according to various embodiments may further include, after configuring the charging level for charging the battery to the second charging level, resetting the number of times that the supplementary charging is performed and the time of being connected to the power transmission device, and reconfiguring the specified number of times and the specified time to a specified number of times and a specified time which correspond to the second charging level.

In various embodiments, the configuring to the second charging level may include obtaining a first score, based on the identified number of times that the supplementary charging is performed, obtaining a second score, based on the identified time of being connected to the power transmission device, and when the sum of the first score and the second score exceeds a specified value, configuring the charging level for charging the battery to the second charging level configured to be lower than the first voltage of the first charging level.

The charging method of the electronic device according to various embodiments may further include, after detachment of the power transmission device is detected, identifying whether reconnection with the power transmission device is made, when the reconnection with the power transmission device is identified, identifying the amount of discharge of the battery, when the amount of discharge of the battery is less than a specified level, configuring the charging level for charging the battery to the first charging level configured to be higher than the second voltage of the second charging level, and when the reconnection with the power transmission device is identified, adjusting the voltage received from the power transmission device through the charging circuit to a first voltage corresponding to the first charging level, and charging the battery with the adjusted first voltage.

In various embodiments, the configuring to the first charging level may include, when the amount of discharge of the battery is less than the specified level, measuring an elapsed time after the detachment of the power transmission device is detected, and, based on the measured elapsed time exceeding a specified time, configuring the charging level for charging the battery to the first charging level configured to be higher than the second voltage of the second charging level.

In various embodiments, the configuring to the first charging level may include obtaining a first score, based on the amount of discharge of the battery, obtaining a second score, based on the measured elapsed time after the detachment of the power transmission device is detected, and when the sum of the first score and the second score exceeds a specified value, configuring the charging level for charging the battery to the first charging level configured to be higher than the second voltage of the second charging level.

The charging method of the electronic device according to various embodiments may further include identifying the amount of charge of the battery while charging the battery with the adjusted first voltage, and when the amount of charge of the battery exceeds a second specified level, configuring the charging level for charging the battery to the second charging level configured to be lower than the first voltage of the first charging level.

The charging method of the electronic device according to various embodiments may further include accumulating the identified amount of discharge of the battery and storing the accumulated amount of discharge in a memory of the electronic device.

The charging method of the electronic device according to various embodiments may further include, if detachment of the power transmission device is detected, measuring an elapsed time after the detachment of the power transmission device is detected, configuring the charging level for charging the battery to the first charging level configured to be higher than the second voltage of the second charging level, based on the measured elapsed time exceeding a specified time, and when reconnection with the power transmission device is identified, adjusting the voltage received from the power transmission device through the charging circuit to a first voltage corresponding to the first charging level, and charging the battery with the adjusted first voltage.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:

a charging circuit;

a battery;

memory, comprising one or more storage media, storing instructions; and one or more processors communicatively coupled to the charging circuit, the battery and the memory, wherein the instructions, when executed by the one or more processors individually or collectively, cause the electronic device to:

charge the battery with a first voltage corresponding to a first charging level, identify the number of times that supplementary charging is performed, after the electronic device is detected to be in a fully-charged state, when the number of times that the supplementary charging is performed exceeds a first specified number of times, configure a charging level for charging the battery to a second charging level configured to be lower than the first charging level, reset the number of times that the supplementary charging is performed, change the first specified number of times to a second specified number of times that corresponds to the second charging level, wherein the second specified number of times is greater than the first specified number of times, control the charging circuit to adjust a voltage output from a power transmission device to a second voltage corresponding to the second charging level and charge the battery with the second voltage, after detachment of the power transmission device is detected, measure an elapsed time after the detachment of the power transmission device is detected, based on the measured elapsed time exceeding a specified time, configure the charging level for charging the battery to the first charging level, when reconnection with the power transmission device is identified, identify an amount of discharge of the battery, when the amount of discharge of the battery is less than a specified level, measure an elapsed time after the detachment of the power transmission device is detected, when the measured elapsed time exceeds a specified time, obtain a first score based on the amount of discharge of the battery, obtain a second score, based on the measured elapsed time after the detachment of the power transmission device is detected, and when a sum of the first score and the second score exceeds a specified value, control the charging circuit to adjust the voltage output from the power transmission device to the first voltage corresponding to the first charging level, and charge the battery with the first voltage.

2. The electronic device of claim 1, wherein the instructions, when executed by the one or more processors individually or collectively, further cause the electronic device to:

when the number of times that the supplementary charging is performed exceeds the first specified number of times, identify a time period during which the power transmission device is connected to the electronic device, and when the time period during which the power transmission device is connected to the electronic device exceeds a specified time period, configure the charging level for charging the battery to the second charging level configured to be lower than the first voltage of the first charging level.

3. The electronic device of claim 2, wherein the instructions, when executed by the one or more processors individually or collectively, further cause the electronic device to:

after configuring the charging level for charging the battery to the second charging level, reset the time period during which the power transmission device is connected to the electronic device, and reconfigure the specified time period to a specified time period which corresponds to the second charging level.

4. The electronic device of claim 2, wherein the instructions, when executed by the one or more processors individually or collectively, further cause the electronic device to:

obtain a first score, based on the identified number of times that the supplementary charging is performed, obtain a second score, based on the identified time period during which the power transmission device is connected to the electronic device, and when a sum of the first score and the second score exceeds a specified value, configure the charging level for charging the battery to the second charging level.

5. The electronic device of claim 1, wherein the instructions, when executed by the one or more processors individually or collectively, further cause the electronic device to:

identify an amount of charge of the battery while charging the battery with the first voltage, and when the amount of charge of the battery exceeds a second specified level, configure the charging level for charging the battery to the second charging level.

6. The electronic device of claim 1, wherein the instructions, when executed by the one or more processors individually or collectively, further cause the electronic device to accumulate the identified amount of discharge of the battery and store the accumulated amount of discharge in the memory.

7. The electronic device of claim 6, wherein the instructions, when executed by the one or more processors individually or collectively, further cause the electronic device to analyze a usage pattern of a user of the electronic device based on the stored accumulated amount of discharge in the memory.

8. The electronic device of claim 1, further comprising:

a switch controlling a connection between the charging circuit and the battery, the switch communicatively coupled to the one or more processors, wherein the instructions, when executed by the one or more processors individually or collectively, further cause the electronic device to:

set the switch to an off state when the battery is in a fully charged state so that power from the charging circuit is not transmitted to the battery, and set the switch to an on state when voltage of the battery is less than or equal to a specified voltage so that power from the charging circuit will provide a supplementary charge to the battery.

9. A charging method of an electronic device, the method comprising:

charging a battery with a first voltage corresponding to a first charging level;

identifying the number of times that supplementary charging is performed, after the electronic device is detected to be in a fully-charged state;

when the number of times that the supplementary charging is performed exceeds a first specified number of times, configuring a charging level for charging the battery to a second charging level configured to be lower than the first charging level;

resetting the number of times that the supplementary charging is performed;

changing the first specified number of times to a second specified number of times that corresponds to the second charging level, wherein the second specified number of times is greater than the first specified number of times;

controlling a charging circuit to adjust a voltage output from a power transmission device to a second voltage corresponding to the second charging level and charging the battery with the second voltage;

after detachment of the power transmission device is detected, measuring an elapsed time after the detachment of the power transmission device is detected;

based on the measured elapsed time exceeding a specified time, configuring the charging level for charging the battery to the first charging level;

when reconnection with the power transmission device is identified, identifying an amount of discharge of the battery;

when the amount of discharge of the battery is less than a specified level, measuring an elapsed time after the detachment of the power transmission device is detected;

when the measured elapsed time exceeds a specified time, obtaining a first score based on the amount of discharge of the battery;

obtaining a second score, based on the measured elapsed time after the detachment of the power transmission device is detected; and when a sum of the first score and the second score exceeds a specified value, controlling the charging circuit to adjust the voltage output from the power transmission device to the first voltage corresponding to the first charging level, and charging the battery with the first voltage.

10. The method of claim 9, wherein the configuring of the charging level to the second charging level comprises:

when the number of times that the supplementary charging is performed exceeds the first specified number of times, identifying a time period during which the power transmission device is connected to the electronic device; and when the time period during which the power transmission device is connected to the electronic device exceeds a specified time period, configuring the charging level for charging the battery to the second charging level.

11. The method of claim 10, further comprising:

after configuring the charging level for charging the battery to the second charging level, resetting the time period during which the power transmission device is connected to the electronic device; and reconfiguring the specified time period to a specified time period which correspond to the second charging level.

12. The method of claim 10, wherein the configuring of the charging level to the second charging level comprises:

obtaining a first score, based on the identified number of times that the supplementary charging is performed;

obtaining a second score, based on the identified time of being connected to the power transmission device; and when a sum of the first score and the second score exceeds a specified value, configuring the charging level for charging the battery to the second charging level.

13. The method of claim 9, further comprising:

identifying an amount of charge of the battery while charging the battery with the first voltage; and when the amount of charge of the battery exceeds a second specified level, configuring the charging level for charging the battery to the second charging level.

14. The method of claim 9, further comprising:

accumulating the identified amount of discharge of the battery and storing the accumulated amount of discharge in a memory of the electronic device.

* * * * *